(12) United States Patent
Lee et al.

(10) Patent No.: US 8,872,391 B2
(45) Date of Patent: Oct. 28, 2014

(54) ELECTRONIC DEVICE AND METHOD OF CONTROLLING THE SAME

(75) Inventors: Haesoo Lee, Seoul (KR); Jaehong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 775 days.

(21) Appl. No.: 13/156,136

(22) Filed: Jun. 8, 2011

(65) Prior Publication Data

US 2012/0001490 A1 Jan. 5, 2012

(30) Foreign Application Priority Data

Jun. 30, 2010 (KR) .................. 10-2010-0062720

(51) Int. Cl.
*H02J 3/14* (2006.01)

(52) U.S. Cl.
CPC ............. *H02J 3/14* (2013.01); *H02J 2003/146* (2013.01); *Y04S 20/242* (2013.01); *Y02B 70/3225* (2013.01); *Y02B 70/3266* (2013.01); *H02J 2003/143* (2013.01); *Y04S 20/224* (2013.01); *Y04S 20/222* (2013.01)
USPC ........................................................ 307/149

(58) Field of Classification Search
USPC ........................................................ 307/149
See application file for complete search history.

*Primary Examiner* — Hal Kaplan
(74) *Attorney, Agent, or Firm* — Birch, Stewart, Kolasch & Birch, LLP

(57) ABSTRACT

An electronic device and a method of controlling the electronic device are provided. Based on smart grid information received from a smart grid network, contents are played by an electronic device that consumes less power at a time slot during which a high electricity rate applies, thus minimizing electricity fees.

22 Claims, 26 Drawing Sheets

FIG. 16

| SOURCE○ | ACCESS INFORMATION | FEE INFORMATION |
|---|---|---|
| FIRST BROADCAST STATION(105) | CH 06 | ₩2,000 |
| SECOND BROADCAST STATION(106) | CH 09 | ₩2,000 |
| FIRST WEBSITE(107) | www.aaa.co.kr | ₩1,500 |
| SECOND WEBSITE(108) | www.bbb.com | ₩1,500 |

ELECTRONIC DEVICE AND METHOD OF CONTROLLING THE SAME

CROSS-REFERENCE TO RELATED APPLICATION

This application claims priority to Korean Patent Application No. 10-2010-0062720, filed on Jun. 30, 2010, and all the benefits accruing therefrom under 35 U.S.C. §119, the contents of which are herein incorporated by reference in their entirety.

BACKGROUND

1. Technical Field

The embodiments of the present invention are directed to an electronic device having power saving functions and a method of controlling the electronic device.

2. Discussion of the Related Art

The introduction of smart grids for efficient use of electric power in places requiring electric power may lead to a differential pricing system in which electricity rates are varied depending on electricity demand. There is a need for developing a technology that may efficiently control various home electronic devices according to the introduction of smart grids.

SUMMARY

Exemplary embodiments of the present invention provide an electronic device that may save electricity rates and a method of controlling the electronic device.

The present is not limited to the above embodiments. Other embodiments of the present invention will become apparent by one or ordinary skill in the art from the detailed description in conjunction with the accompanying drawings.

According to an embodiment, there is provided an electronic device comprising a communication unit that includes a receiving unit, the receiving unit receiving power information including at least one of per-time slot electricity rate information and power demand information associated with a smart grid, an output unit that outputs content, and a controller that obtains a source list including information on at least source that provides the content while outputting the content through the output unit and, when a high rate time slot starts according to the received power information, provides the source list.

According to an embodiment of the present invention, there is provided a method of controlling an electronic device comprising outputting content, receiving power information including at least one of per-time slot electricity rate information and power demand information, obtaining a source list including information on at least one source providing the content, and providing the source list when a high-rate time slot starts according to the received power information while the content is outputted.

According to an embodiment, there is provided an electronic device comprising a communication unit that includes a receiving unit, the receiving unit receiving power information including at least one of per-time slot electricity rate information and power demand information associated with a smart grid, an output unit that outputs content, and a controller that provides a user interface inquiring whether to stop outputting the content and whether to include the content in a list of contents accessible by a user when a high rate time slot starts according to the received power information while the content is outputted through the output unit.

According to the embodiments of the present invention, the electronic device and the method of controlling the electronic device may significantly save power consumption by allowing a user to view contents through an alternative electronic device consuming less power. Also, the embodiments of the present invention may encourage a user to reduce power consumption at a high rate time slot during which more power is consumed.

BRIEF DESCRIPTION OF THE DRAWINGS

FIGS. 13 to 16 are views illustrating a method of controlling an electronic device according to an embodiment of the present invention.

DETAILED DESCRIPTION

Figure 1:
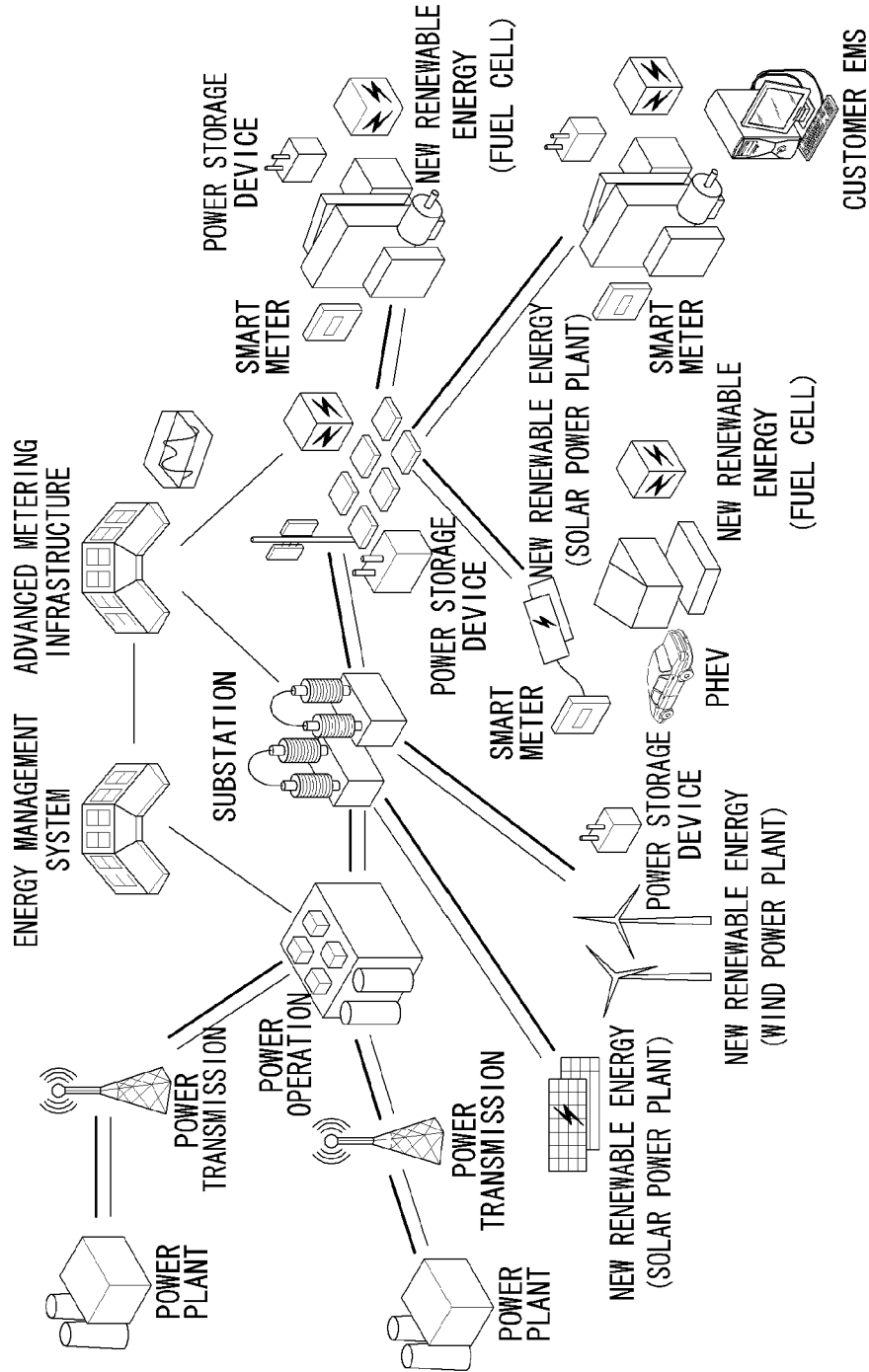
FIG. 1 is a view schematically illustrating a smart grid.

Hereinafter, exemplary embodiments of the present invention will be described with reference to the accompanying drawings, wherein like reference numerals are used to denote the same or substantially the same elements throughout the drawings and the specification.

FIG. 1 is a view schematically illustrating a smart grid. The smart grid includes a power plant, for example, such as a thermal power plant, a nuclear power plant, a hydroelectric power plant, a solar power plant, a wind power plant, etc.

The thermal power plant, the nuclear power plant, or the hydroelectric power plant supplies electricity to a power operation through power lines. The power operation carries electricity to a substation to distribute electricity to customers, such as homes or offices.

Electricity generated by new renewable energy sources is also supplied to the substation. The electricity is distributed from the substation to offices or homes via a power storage device.

Homes using a home area network (HAN) may generate electricity from solar panels or fuel cells mounted in a plug-in hybrid electric vehicles (PHEV) to utilize the generated electricity for themselves or to sell remaining electricity to other customers.

A smart meter is installed at each of the homes or offices to provide a user with power consumption and electricity rates in real time. The user may establish an electricity use plan based on the power consumption and electricity rates.

A bi-directional communication may be possible between the power plant, the power operation, the power storage device, and the customer. Accordingly, it is possible not only to unilaterally supply electricity to the customer but also to notify a circumstance of the customer to the power storage device, the power operation, or the power plant. Thus, electricity generation and electricity distribution may be carried out suitably to the customer's circumstance.

The smart grid includes an energy management system (EMS) and an advanced metering infrastructure (AMI). The EMS performs real-time power management for the customers and real-time anticipation of required power. The AMI measures power consumption in real time.

Metering devices used for a smart grid include an open-architecture based technology for encompassing customers so that a customer may efficiently use electricity and a power provider may effectively operate a system by monitoring any problems with the system.

The term "open architecture" herein refers to a standard under which electric devices produced from any manufacturers may be connected to one another over the smart grid network unlike a general communication network.

Accordingly, the metering devices used for the smart grid enables a customer-friendly efficiency concept, such as "Prices to Devices".

That is, price signals are related from an electricity market to each home in real time by an EMS installed in the home. The EMS may communicate with each electric device to control the device. A user may be aware of power information on each electric device by referring to the EMS and may perform a power information process, such as setup of a limit to power consumption or electricity rate, based on the power information, thus saving energy or rates.

The EMS may include a local EMS used for homes or offices and a central EMS that bi-laterally communicates with the local EMS to treat information collected by the local EMS.

Since power information may be communicated in real time between a supplier and a customer over the smart grid, a "real-time power network reaction" may be realized, thus saving high costs required for estimating a peak demand.

Figure 2:
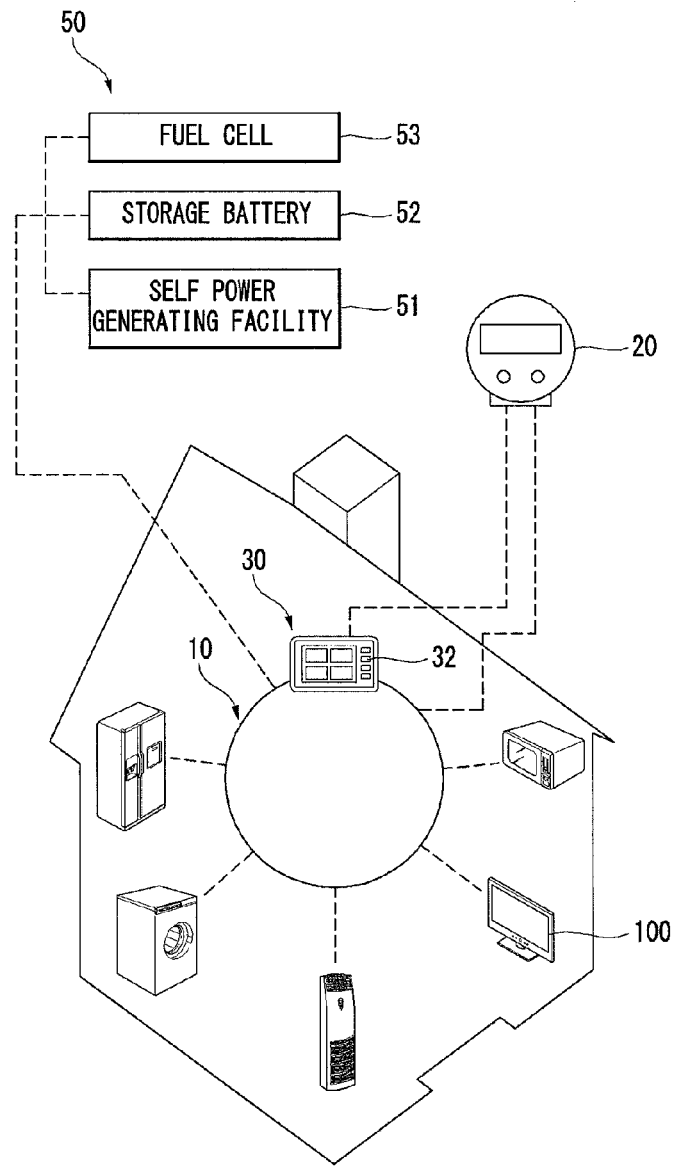
FIG. 2 is a view illustrating a power management network of a home that is a main customer of a smart grid service.

FIG. 2 is a view illustrating a power management network 10 of a home that is a main customer of a smart grid service.

The power management network 10 includes a smart meter 20 that may measure electricity supplied to the home and an electricity rate in real time and an EMS 30.

The electricity rate may be charged on an hourly basis. While power consumption is sharply increased, the per-hour electricity rate may be increased, and while power consumption is relatively small, such as a late night time, the per-hour electricity rate may be decreased.

The electricity rate may be equally charged between a time slot having high power demand and a time slot having low power demand. When electricity is saved by a user while the power demand increases, a rebate may be paid to the user as much electricity as he saved.

The EMS 30 may be implemented as a terminal that includes an input button 32 for user's manipulation.

The smart meter 20 and the EMS 30 are connected through an internal network in the home to an electronic device, such as a digital television (DTV, 100), a refrigerator, a washing machine, a drier, an air conditioner, a cooking machine, an illumination device, or a light shielding device, to bi-laterally communicate with the electronic device. The EMS manages electricity consumed by electronic devices included in the power management network 10 and supplies electricity to the electronic devices. According to an embodiment, the EMS 30 may control the operation of the electronic devices. According to an embodiment, the EMS 30 may be embedded in a DTV or a computer.

According to an embodiment, the internal network may use a wireless or wired communication scheme, such as power line communication (PLC). The electronic devices are connected to one another to communicate with one another.

The power management network 10 includes an auxiliary power supply 50 prepared in the home. The auxiliary power supply 50 includes a self power generating facility 51, such as a solar power generation unit, and a storage battery 52 that stores electricity generated by the self power generating facility 51.

The auxiliary power supply 50 includes a fuel cell 53.

The auxiliary power supply 50 supplies electricity to the home while the home does not receive electricity from an external power supply, such as a power provider.

The smart meter 20 or the EMS 30 displays the amount of power that may be supplied from the auxiliary power supply 50 or the amount of power that is stored in the auxiliary power supply 50.

Figure 3:
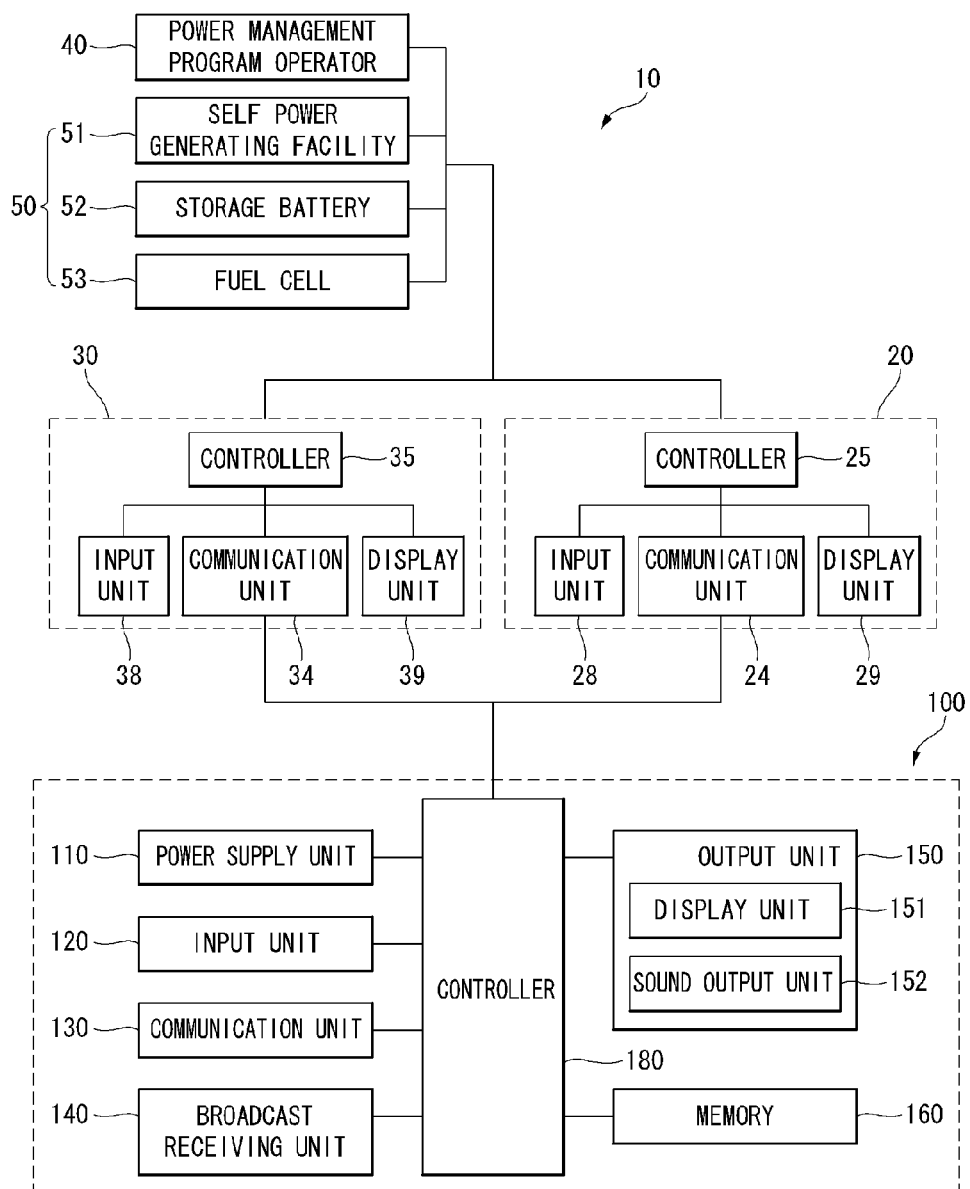
FIG. 3 is a block diagram illustrating the power management network and a DTV connected to the power management network.

FIG. 3 is a block diagram illustrating the power management network 10 and a DTV 100 connected to the power management network 10.

A power management program operator 40 is a power provider that includes a general power plant, such as thermal, nuclear, or hydroelectric power plant, or a power plant using new renewable energy sources, such as sunlight, wind, or geothermal heat. However, the present invention is not limited thereto.

The power management program operator 40 supplies electricity and information on a differential pricing system to each home so that a user may establish a strategy for saving electricity rates based on the information.

Further, the power management program operator 40 provides the user with a guide for saving electricity rates. For example, the power management program operator 40 may suggest a reference for a high rate time slot so that the user may reasonably consume electricity. A power supply of the power management program operator 40 is hereinafter referred to as "external power supply".

The "high rate time slot" refers to a time slot during which a per-hour electricity rate is more than a predetermined rate due to the explosion in power demand so that the electricity rate is sharply increased.

The auxiliary power supply 50 supplies electricity to the home separately from the external power supply. The auxiliary power supply 50 and the external power supply are connected to the smart meter 20 and the EMS 30 to communicate with the smart meter 20 and the EMS 30. The smart meter 20 and the EMS 30 may communicate with the electronic devices. According to an embodiment, each of the electronic devices may have a power supply unit that receives electricity from the external power supply and/or the auxiliary power supply 50.

The EMS 30 includes a controller 35, an input unit 38, a communication unit 34, and a display unit 39. The smart meter 20 includes a controller 25, an input unit 28, a communication unit 24, and a display unit 29.

The EMS 30 or the smart meter 20 is connected to the DTV 100 to communicate with the DTV 100. The DTV 100 includes a communication unit 130 that may communicate with the communication unit 34 of the EMS 30 or the communication unit 24 of the smart meter 20.

The communication unit 130 of the DTV 100 receives power information, such as electricity rate information, that varies in real time from the EMS 30 or the smart meter 20.

Referring to FIG. 3, the DTV 100 further includes a power supply unit 110, an input unit 120, a broadcast receiving unit 140, an output unit 150, a memory 160, and a controller 180.

The power supply unit 110 receives electricity from the external power supply and/or the auxiliary power supply 50 and supplies necessary electricity to the components of the DTV 100.

The input unit 120 generates input data allowing a user to control the operation of the power management network 10.

The communication unit 130 receives power information associated with the smart grid (hereinafter, also referred to as "smart grid information"), such as electricity rate information, as described above. According to an embodiment, the communication unit 130 may include one or more module that allows for communication between the DTV 100 and a network (for example, Internet).

According to an embodiment, the communication unit 130 may receive smart grid information in a wired manner, such as Ethernet or PLC, or in a wireless manner, such as Zigbee.

The smart grid information includes the electricity rate information. According to an embodiment, the smart grid may include various sources and various transmission/receipt methods.

For example, the electricity rate information may include at least one of per-time slot electricity rate information and power demand information.

For example, the communication unit 130 may receive the smart grid information from a smart operation center 11 or a smart grid network 12 that will be described below with reference to FIG. 4, or a specific server existing over an external network.

According to an embodiment, the communication unit 130 may receive the smart grid information through various communication protocols, such as various wired or wireless protocols, including mobile Internet protocols and mobile communication network protocols.

According to an embodiment, the DTV 100 may not include the communication unit 130. The communication unit 130 may be independently provided outside of the DTV 100. The communication unit 130 may communicate with the DTV 100 by a wired/wireless communication method. The controller 180 may process data received through the communication unit 130. For example, the communication unit 130 may be included in a set-top box (not shown) connected to the DTV 100.

The broadcast receiving unit 140 receives a broadcast signal and/or broadcast-related information from an external broadcast management server through a broadcast channel.

According to an embodiment, the broadcast channel may include a satellite channel and/or a terrestrial channel. According to an embodiment, the broadcast management server may include a server that generates a broadcast signal and/or broadcast-related information and transmits the generated signal and/or information to a terminal, such as the DTV 100, or a server that receives a previously generated broadcast signal and/or broadcast-related signal and transmits the received signal and/or information to the terminal. According to an embodiment, the broadcast signal may include a TV broadcast signal, a radio broadcast signal, a data broadcast signal, or a combined broadcast signal of a TV broadcast signal, a radio broadcast signal, and a data broadcast signal.

According to an embodiment, the broadcast-related information may include information on a broadcast channel, a broadcast program, or a broadcast service provider.

For example, the broadcast-related information may include an electronic program guide (EPG) or an electronic service guide (ESG).

The broadcast receiving unit 140 receives a broadcast signal through various broadcast systems. According to an embodiment, the broadcast receiving unit 140 may be configured to be suitable for a digital broadcast system or other broadcast systems providing the broadcast signal.

According to an embodiment, the DTV 100 may not include the broadcast receiving unit 140. The broadcast receiving unit 140 may be independently provided outside of the DTV 100. The broadcast receiving unit 140 may communicate with the DTV 100 by a wired/wireless communication method. The controller 180 may process data received through the broadcast receiving unit 140. For example, the broadcast receiving unit 140 may be included in a set-top box (not shown) connected to the DTV 100.

The broadcast signal and/or the broadcast-related information received through the broadcast receiving unit 140 are stored in the memory 160.

The output unit 150 generates a visual, auditory, or tactile output. The output unit 150 includes a display unit 151 and a sound output unit 152. According to an embodiment, the output unit 150 may further include a haptic module that generates a tactile output (for example, vibration).

The display unit 151 displays information processed by the DTV 100.

According to an embodiment, the display unit 151 may include at least one of a liquid crystal display (LCD), a thin film transistor-liquid crystal display (TFT-LCD), an organic light-emitting diode (OLED) display, a flexible display, and a 3-dimensional display.

According to an embodiment, two or more display units 151 may be provided in the DTV 100.

According to an embodiment, the DTV 100 may not include the display unit 151 and the display unit 151 may be provided separately from the DTV 100. The controller 180 may control the display unit 151 wiredly or wirelessly.

According to an embodiment, in cases where the display unit 151 is provided separately from the DTV 100, the DTV 100 and the display unit 151 may or may not share a power supply source.

The sound output unit 152 outputs audio data that is received from an external source (not shown) or generated by the DTV 100. For example, the sound output unit 152 outputs a sound signal associated with a function performed by the DTV 100.

According to an embodiment, the sound output unit 152 may include a speaker or a buzzer, and may output a sound through an earphone jack so that a user may listen to the sound by using an earphone connected to the earphone jack.

The memory 160 stores a program for an operation of the controller 180 and temporarily or permanently stores input/output data, such as audios, still images, moving pictures, broadcast-related information, etc.

According to an embodiment, the memory 160 may include at least one of storage media including a flash memory, a hard disk, a micro multimedia card type memory, a card type memory, such as a SD or XD memory, a random access memory (RAM), a static random access memory (SRAM), a read-only memory (ROM), an electrically erasable programmable read-only memory (EEPROM), a programmable read-only memory (PROM), a magnetic type memory, a magnetic disk, and an optical disk.

According to an embodiment, the memory 160 may be provided separately from the DTV 100. For example, a digital video recorder (DVR) serving as the memory 160 is provided separately from the DTV 100.

The memory 160 may also be refereed to as "storage".

According to an embodiment, the DTV 100 may be operated in association with a web storage that performs a storage function of the memory 160 over the Internet.

The controller 180 controls a general operation of the DTV 100. For example, the controller 180 performs control and processing associated with, for example, broadcast receipt, broadcast recording, or access to the Internet.

According to an embodiment, the controller 180 may include a multimedia module for playing multimedia. The multimedia module may be provided in the controller 180 or separately from the controller 180. The multimedia module may include an audio/video decoder.

The exemplary embodiments described herein may be implemented in software, hardware, or a combination thereof, or implemented in a recording medium that may be read by a computer or a similar device thereof.

When implemented in hardware, the embodiments may be embodied by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electrical unit for performing a function. The embodiments may also be implemented by the controller 180.

When implemented in software, the embodiments may be embodied by separate software codes or modules, each performing a function or operation. The software codes may be implemented by a software application written in a proper program language. The software codes may be stored and executed by the controller 180.

Figure 4:
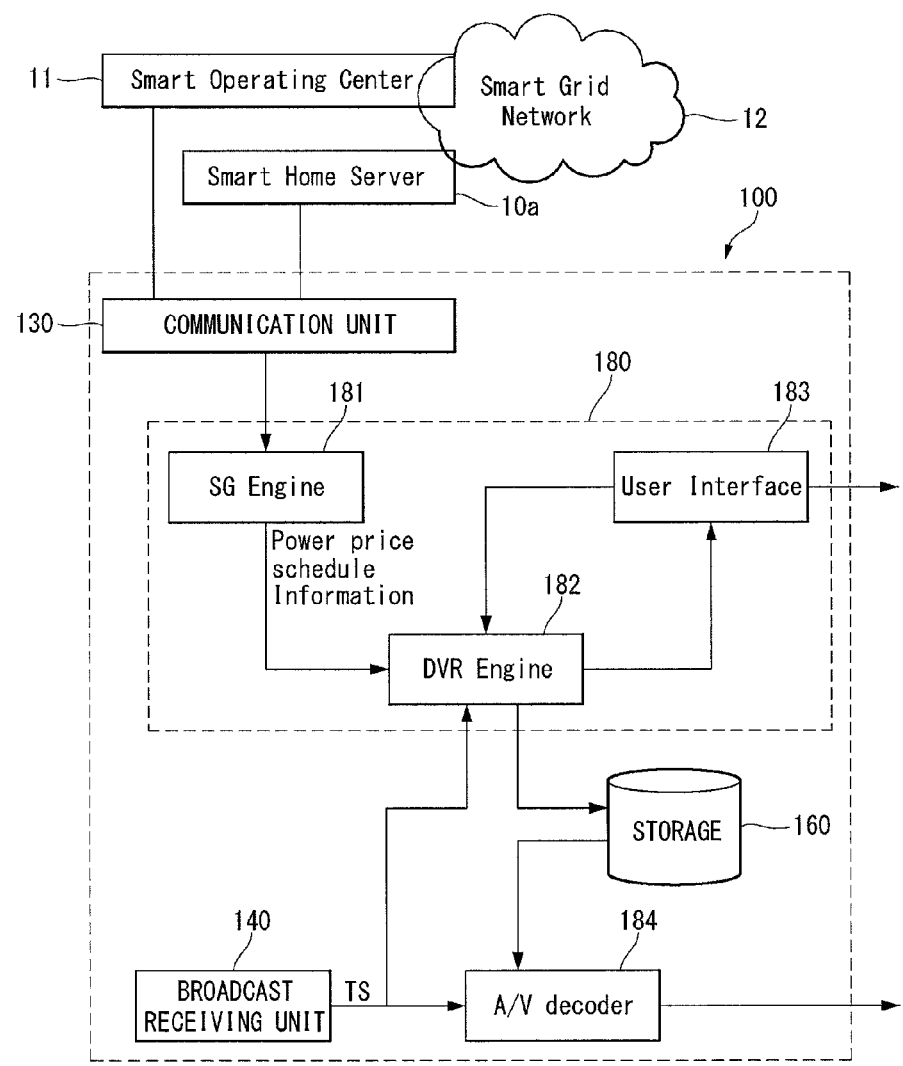
FIG. 4 is a view illustrating the DTV in association with smart grid information and broadcast contents.

FIG. 4 is a view illustrating the DTV 100 in association with smart grid information and broadcast contents.

Referring to FIG. 4, the controller 180 of the DTV 100 includes a smart grid engine 181, a DVR engine 182, and a UI processing unit 183.

The smart grid engine 181 processes the smart grid information received through the communication unit 130 to be capable of being used by the DTV 100 and stores the processed information in the storage 160 that is provided in or outside of the DTV 100.

As shown in FIG. 4, the communication unit 130 receives the smart grid information from a smart network 12 through a smart operation center 11 provided outside of the home or through a smart home server 10a provided in the home.

The smart operation center 11 includes the EMS provided outside of the home, and the smart home server 10 includes the power management network 10 as described above.

The DVR engine 182 performs a function associated with storage of the broadcast contents, such as generation of information necessary for storage of the broadcast contents.

For example, according to an embodiment, the DVR engine 182 may receive broadcast contents requested by the UI processing unit 183 through the broadcast receiving unit 140 in the form of transport streams (TSs) and may store the received broadcast contents in the storage 160.

According to an embodiment, the DVR engine 182 may calculate an optimum time for viewing the broadcast contents stored in the storage 160 using the smart grid information processed and stored by the smart grid engine 181 and may notify a user of arrival of the optimum time.

The UI processing unit 183 performs functions associated with generation, storage, and output of various user interfaces to be described below and a function of processing a user input received through the user interfaces.

The DTV 100 further includes an A/V decoder 184. According to an embodiment, the A/V decoder 184 may be provided in the controller 180 or as a module separate from the controller 180.

The A/V decoder 184 decodes and outputs transmission streams received through the broadcast receiving unit 140 or the contents stored in the memory 160.

Although the DTV has been described as an example with the assumption that the components are integrally provided in the DTV, the embodiments of the present invention are not limited thereto. According to an embodiment, some of the components may be excluded from the DTV while the excluded components are included in a separate device, such as a set-top box. The embodiments of the present invention may also be achieved by interoperation between the DTV and the set-top box.

Further, although the DTV 100 has been described as a home electronic device, the embodiments of the present invention are not limited thereto. Hereinafter, various embodiments of the present invention will be described by employing the DTV 100 as an example of the electronic device.

Figure 5:
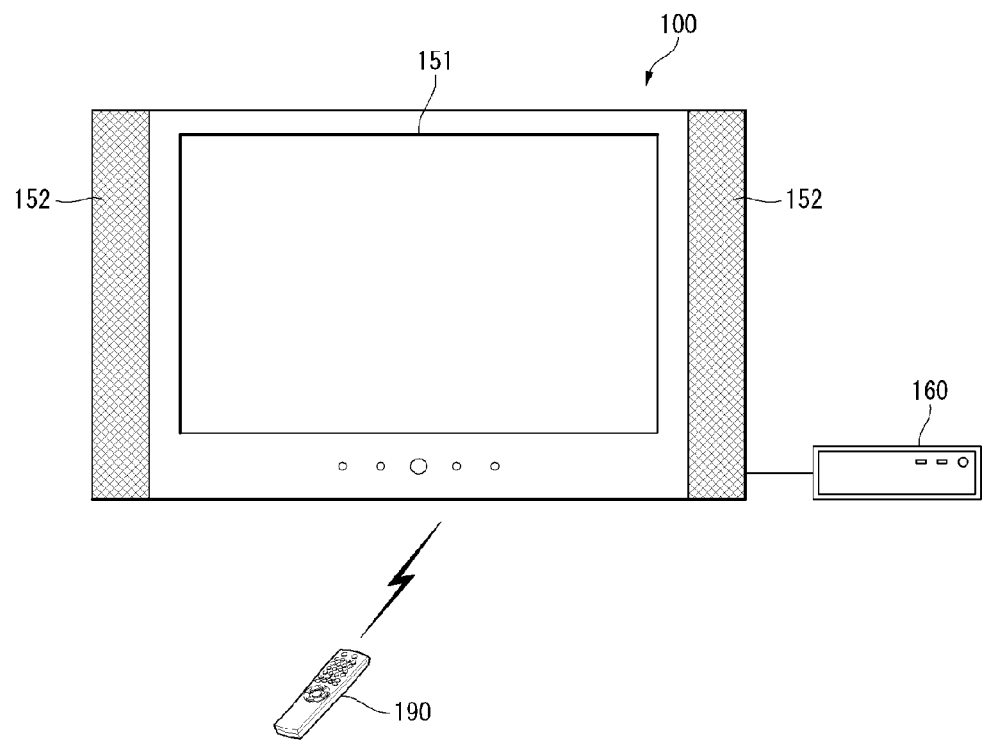
FIG. 5 is a view illustrating an example of installing the DTV and the storage.

FIG. 5 is a view illustrating an example of installing the DTV 100 and the storage 160. As described above, the storage 160 serves as the memory 160 and may be provided separately from the DTV 100.

Referring to FIG. 5, a user controls the DTV 100 using a remote controller 190.

Although it is illustrated in FIG. 5 that a user uses the separate remote controller 190 to control an electronic device, such as the DTV 100, the embodiments of the present invention are not limited thereto. According to an embodiment, the user may also control the electronic device by his motion or gesture, or by entering his voice without the use of the separate remote controller 190.

Figure 6:
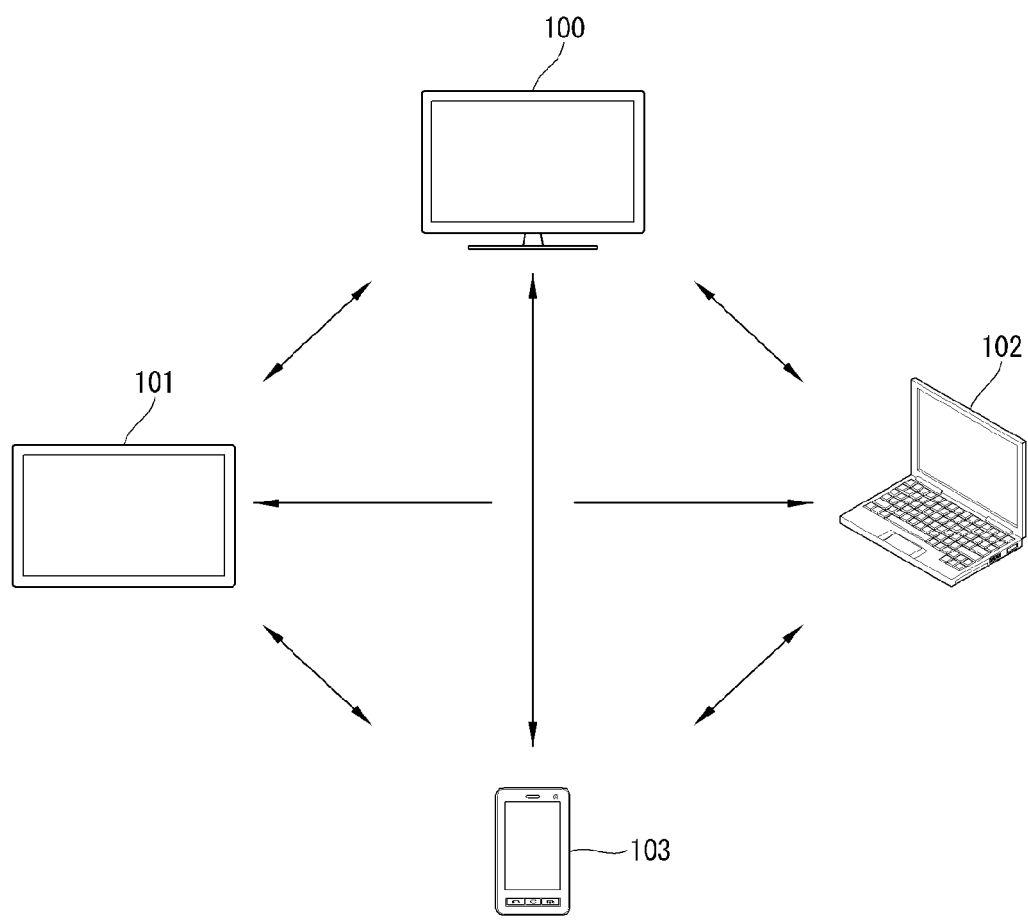
FIGS. 6 and 7 are views schematically illustrating a system environment to which the embodiments of the present invention apply.
Figure 7:
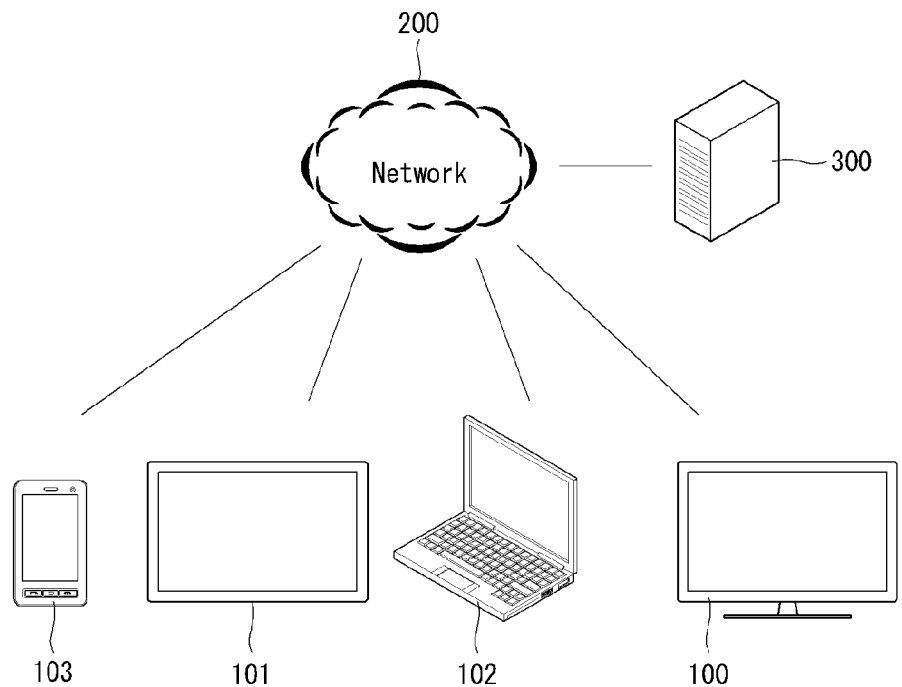

FIGS. 6 and 7 schematically illustrate a system environment to which an embodiment of the present invention applies.

Referring to FIGS. 6 and 7, the system environment includes a plurality of electronic devices 100, 101, 102, and 103, a network 200, and a server 300 over the network 200.

As shown in FIG. 1, the plurality of electronic devices 100, 101, 102, and 103 may communicate with each other by a wired or wireless method.

The embodiments of the present invention are not limited to a specific communication method. The embodiments of the present invention may also apply to all of the existing wireless communication methods and to all communication methods which will appear in the future.

For example, the communication methods may include UPnP (Universal Plug and Play), DLNA (Digital Living Network Alliance), or WiFi communication methods.

The mutual communication may also be performed by a near-field communication method. Also, the plurality of electronic devices 100, 101, 102, and 103 may communicate with the network 200 as shown in FIG. 7. For example, the plurality of electronic devices 100, 101, 102, and 103 may receive multimedia contents from the server 300 over the network 200.

The network 200 may include, for example, a mobile communication network, a wired Internet network, a wireless Internet network, or a broadcast network.

The plurality of electronic devices 100, 101, 102, and 103 each may be a stationary terminal or a mobile terminal.

The plurality of electronic devices 100, 101, 102, and 103 may include, for example, a mobile phone, a smart phone, a computer, a laptop computer, a digital broadcast terminal, a PDA (Personal Digital Assistant), a PMP (Portable Multimedia Player), a navigation system, or a MID (Mobile Internet Device).

Hereinafter, the plurality of electronic devices 100, 101, 102, and 103 are also referred to as a first electronic device 100, a second electronic device 101, a third electronic device 102, and a fourth electronic device 103, respectively.

As shown in FIGS. 6 and 7, it is assumed for convenience of description that the first electronic device 100 is a DTV (Digital TV), the second electronic device 101 is a mobile terminal, such as a MID, the third electronic device 102 is a computer (for example, a desktop computer or a laptop computer), and the fourth electronic device 103 is a mobile terminal, such as a mobile phone.

Although the first to fourth electronic devices 100, 101, 102, and 103 are exemplified, the number of electronic devices used is not limited to four.

According to the embodiments of the present invention, power fees may be saved by changing electronic devices for outputting contents taking into consideration power fee information included in the received smart grid information. To change electronic devices for outputting contents, the electronic devices need to be compatible with each other. Hereinafter, there will be described a network based on a DLNA (Digital Living Network Alliance) for compatibility and content sharing between the electronic devices. The network based on the DLNA is also referred to as a DLNA network. The DLNA network is merely an example, and a UPnP (Universal Plug and Play) network may be employed as well.

Figure 8:
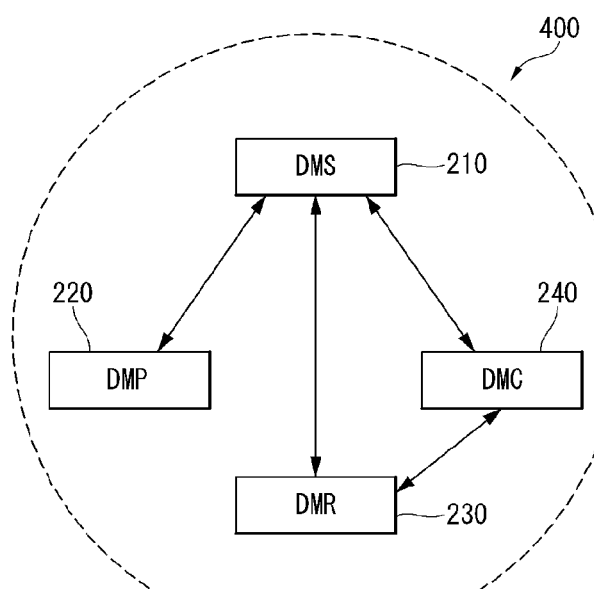
FIG. 8 is a view illustrating a concept of a DLNA network.
Figure 9:
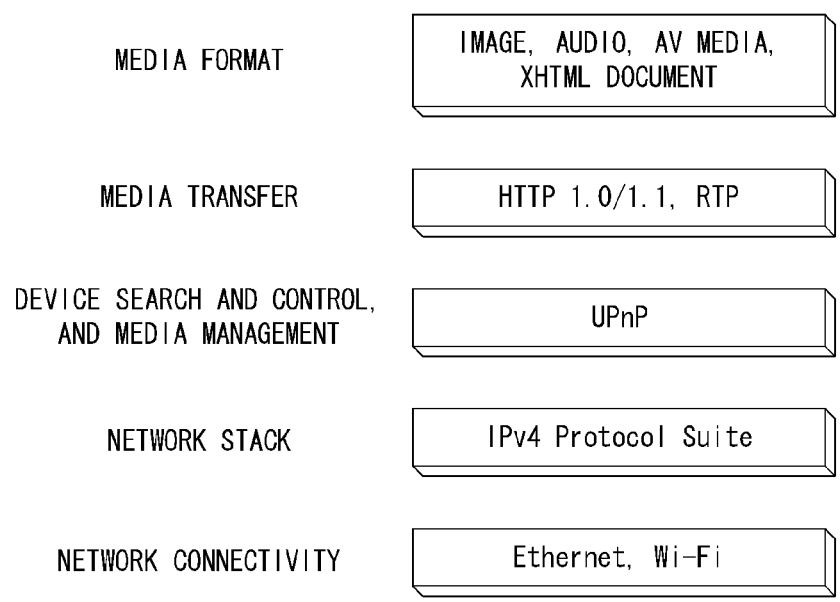
FIG. 9 illustrates functional components according to the DLNA.

Referring to FIGS. 8 and 9, a DLNA network will now be described as an exemplary network for mutual compatibility and content sharing between the electronic devices 100, 101, 102, and 103.

FIG. 8 illustrates a concept of a DLNA network.

The DLNA is a standardization organization for sharing of contents, such as music, videos, or digital photos, between electronic devices over a network.

The DLNA network 400 is based on a UPnP protocol.

The DLNA network 400 includes a digital media server (DMS) 210, a digital media player (DMP) 220, a digital media renderer (DMR) 230, and a digital media controller (DMC) 240.

The DLNA network 400 may include one or more DMS 210, one or more DMP 220, one or more DMR 230, and one or more DMC 240. The DLNA may provide a standard through which the devices may be compatible with one another. The DLNA network 400 may provide a standard through which the DMS 210, the DMP 220, the DMR 230, and the DMC 240 may be compatible with one another.

i. The DMS 210 may provide digital media contents. The DMS 210 may store and manage contents. The DMS 210 may receive various commands from the DMC 240 and may carry out the commands. For example, when receiving a play command, the DMS 210 may search contents to be played and may provide the contents to the DMR 230. The DMS 210 may include, for example, a PC, a PVR (Personal Video Recorder), and a set-top box.

ii. The DMP 220 may control contents or electronic devices, or enables contents to be played. For example, the DMP 220 may perform functions of the DMR 230 for playing contents and functions of the DMC 240 for controlling other electronic devices. The DMP 220 may include, for example, a TV, a DTV, or a home theater.

The DMR 230 may play contents received from the DMS 210. The DMR 230 may include, for example, an electronic picture frame, a computer, or an MID.

The DMC 240 may provide functions of controlling the DMS 210, the DMP 220, and the DMR 230. The DMC 240 may include, for example, a computer, a mobile phone, or a PDA.

i. The DLNA network 400 may include the DMS 210, the DMR 230, and the DMC 240, or may include the DMP 220 and the DMR 230.

The DMS 210, the DMP 220, the DMR 230, and the DMC 240 may be terms for differentiating electronic devices in terms of functionality. For example, in a case where a mobile phone has both a play function and a control function, the mobile phone may correspond to the DMP 220, and in a case where the DTV 100 manages contents, the DTV 100 may correspond to the DMS 210 as well as the DMP 220.

For example, the plurality of electronic devices 100, 101, 102, and 103 shown in FIGS. 6 and 7 each may perform a function corresponding to at least one of the DMS 210, the DMP 220, the DMR 230, and the DMC 240, and may configure the DLNA network 400.

FIG. 9 illustrates functional components according to the DLNA.

The functional components may include a media format layer, a media transport layer, a device discovery & control and media management layer, a network stack layer, and a network connectivity layer.

The network connectivity layer may include a physical layer and a link layer of a network. The network connectivity layer may include Ethernet, Wi-Fi, and Bluetooth. Besides, the network connectivity layer may use a communication medium that may perform IP access.

The network stack layer may use an IPv4 protocol.

The device discovery & control and media management layer may be based on UPnP, particularly on UPnP AV architecture and UPnP device architecture. For example, an SSDP (Simple Service Discovery Protocol) may be used for device discovery. An SOAP (Simple Object Access Protocol) may be used for control.

The media transport layer may use HTTP 1.0/1.1 for stream playing. The media transport layer may also use a RTP (Real-time Transport Protocol).

The media format layer may use images, audios, AV media, XHTML (Extensible Hyper Text Markup Language) documents.

Exemplary embodiments of varying playing devices based on smart grid information will now be described in greater detail.

Figure 10:
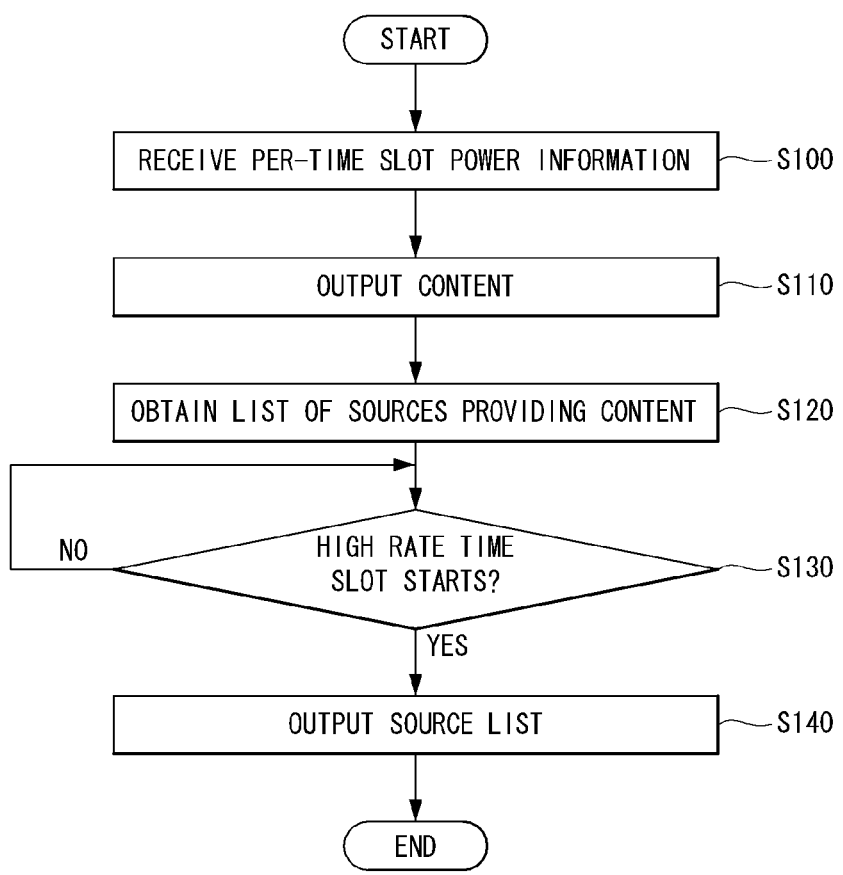
FIG. 10 is a flowchart illustrating a method of controlling an electronic device according to an embodiment of the present invention.
Figure 11:
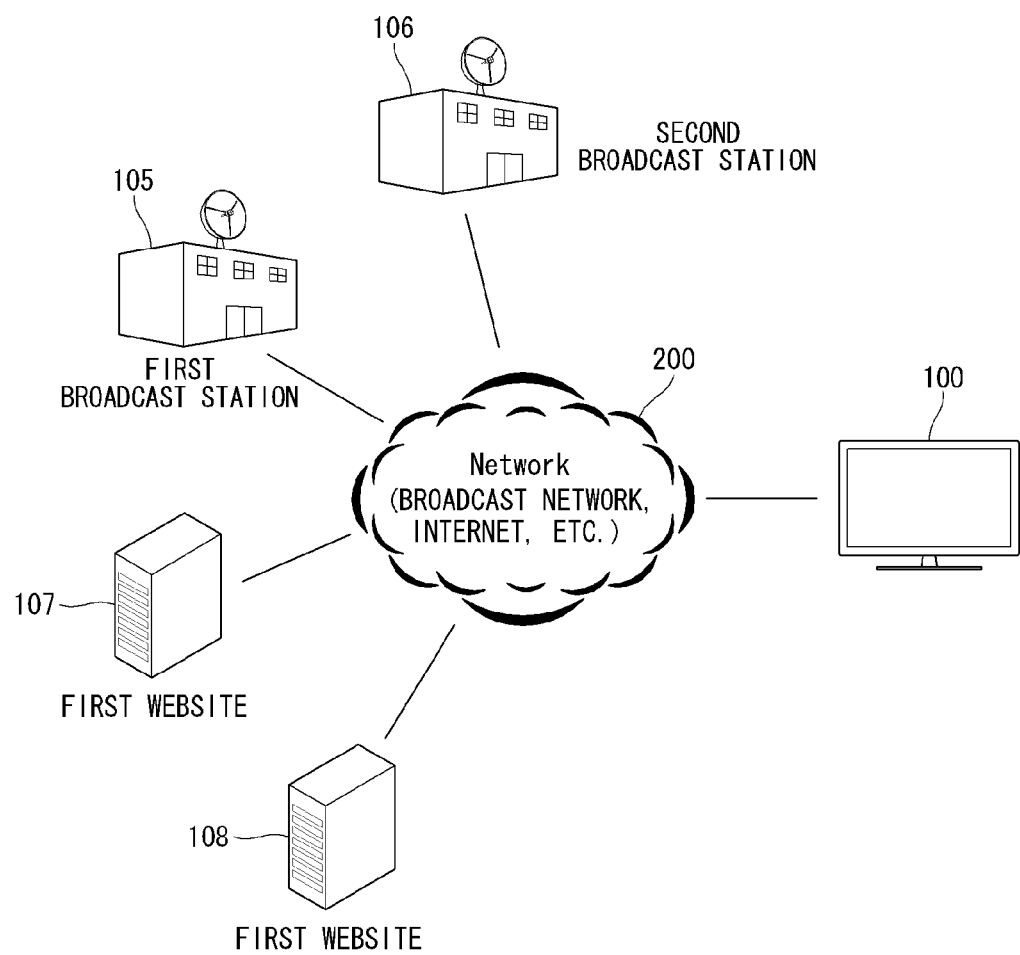
FIG. 11 is a view illustrating a method of controlling an electronic device according to an embodiment of the present invention.

FIG. 10 is a flowchart illustrating a method of controlling an electronic device according to an embodiment of the present invention. FIG. 11 is a view illustrating a method of controlling an electronic device according to an embodiment of the present invention.

The method of controlling an electronic device may be implemented by the plurality of electronic devices 100, 101, 102, and 103 and the environment described in connection with FIGS. 1 to 9. Hereinafter, the controlling method and the operation of an electronic device for implementing the controlling method will be described in detail by employing the first electronic device (DTV) 100 as the electronic device. However, the use of the first electronic device 100 is merely an example, and various types of electronic devices may also be adopted according to embodiments.

Referring to FIG. 10, the controller 180 receives power information including at least one of per-time slot electricity rate information and power demand information through the communication unit 130 as described above (S100).

The controller 180 outputs predetermined content through the output unit 150 (S110). Various types of contents may be provided according to an embodiment. For example, the content may include an audio, a video, animation or text content.

For example, the controller 180 may decode broadcast content received through the broadcast receiving unit 140 by the A/V decoder 184 and may output the decoded content through the output unit 150.

The content outputted through the output unit 150 need not be broadcast content that is on air in real time but may be content stored in the memory 160 of the first electronic device 100 or in the storage 160. Or, the content may also be content stored in the DMS 210. Hereinafter, unless otherwise stated, the "broadcast content" includes, for convenience of description, the contents stored in the memory 160 of the first electronic device 100, in the external storage 160, or in the DMS 210, as well as broadcast content as originally intended.

In step S110, the controller 180 may output the content through the display unit 151.

The controller 180 acquires a source list including information on at least a source that provides the output content (S120).

The output content may also be provided from one or more source other than the source providing the output source (for example, first broadcast station).

An example of the source may be a website or a broadcast channel. The broadcast channel may depend on various types of broadcast standards.

FIG. 11 illustrates an example where the same content is provided from a plurality of sources.

Referring to FIG. 11, a particular content is provided from a first broadcast station 105, a second broadcast station 106, a first website 107, and a second website 108.

The first broadcast station 105, the second broadcast station 106, the first website 107, and the second website 108 correspond to the sources.

The source list may or may not contain information on the sources currently providing the content.

The controller 180 may obtain the source list in various methods.

For example, the controller 180 may obtain the source list by web-searching a key word associated with the output content.

Also, the controller 180 may store broadcast program information of the plurality of sources associated with the output content in the memory 160 and may identify which one among the plurality of sources is outputting the content. At least a source identified to be outputting the content may be included in the source list obtained in step S120.

Further, the controller 180 may receive information on the source from a second electronic device included in the DLNA network 400 and may include the received information in the source list. For example, the controller 180 may request the second electronic device to send information on a broadcast source of particular content and if the information being received, may include the information in the source list.

The controller 180 may perform the above-described procedures while previously recognizing the information on the second electronic device from which the information on the broadcast source may be obtained. For this purpose, the memory 160 may store information on features of the second electronic device (for example, whether to access a broadcast channel).

The controller 180 determines whether a high rate time slot starts or not (S130).

When a current time is immediately before or after the high rate time slot, the controller 180 may determine it as the high rate time slot having started. Or, when it is determined that the high rate time slot starts after a predetermined time, the controller 180 may determine it as the entrance into the high rate time slot.

If it is determined in step S130 that the high rate time slot started, the controller 180 may output the source list acquired in step S120 (S140).

The output of the source list may be performed inside or outside the first electronic device 100. This will be described below in more detail.

Figure 12:
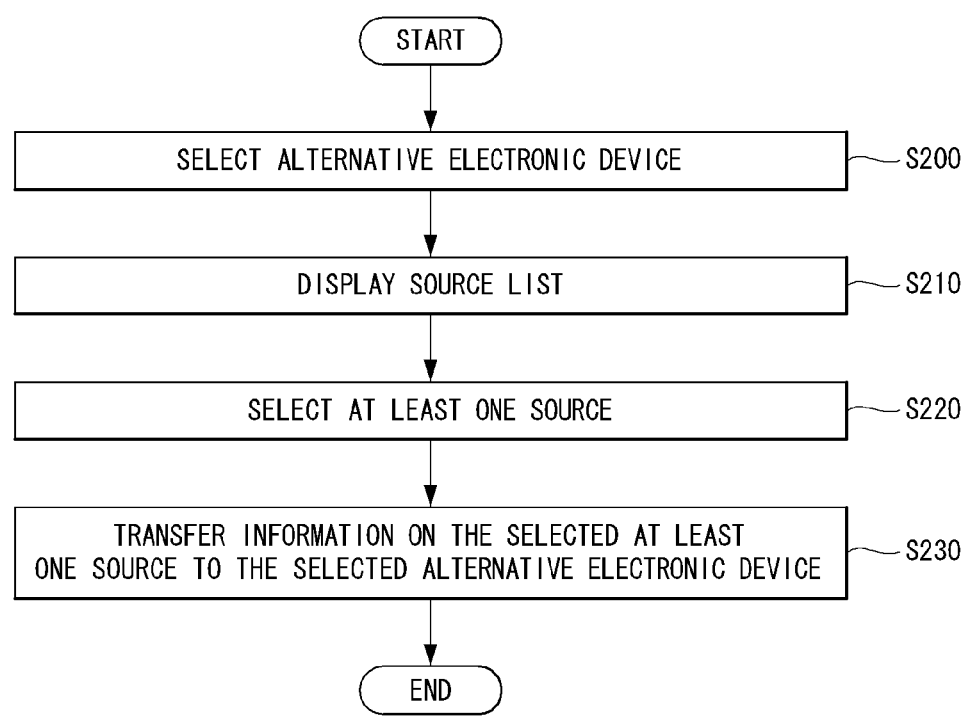
FIG. 12 is a flowchart illustrating a method of controlling an electronic device according to an embodiment of the present invention.

FIG. 12 is a flowchart illustrating a method of controlling an electronic device according to an embodiment of the present invention. FIGS. 13 to 16 are views illustrating a method of controlling an electronic device according to an embodiment of the present invention.

The method of controlling an electronic device may be implemented by the plurality of electronic devices 100, 101, 102, and 103 and the environment described in connection with FIGS. 1 to 9. Hereinafter, the controlling method and the operation of an electronic device for implementing the controlling method will be described in detail by employing the first electronic device (DTV) 100 as the electronic device. However, the use of the first electronic device 100 is merely an example, and various types of electronic devices may also be adopted according to embodiments.

Referring to FIG. 12, the controller 180 may select an alternative electronic device to play the content that is being outputted by a current electronic device (S200).

Step S200 may be implemented by various methods.

For example, when the current time enters into the high rate time slot (S130), the controller 180 may automatically select the alternative electronic device based on a predetermined criterion or a user's setting.

Alternatively, the controller 180 may provide a list of alternative electronic devices so that a user may select an alternative electronic device to play the content.

Figure 13:
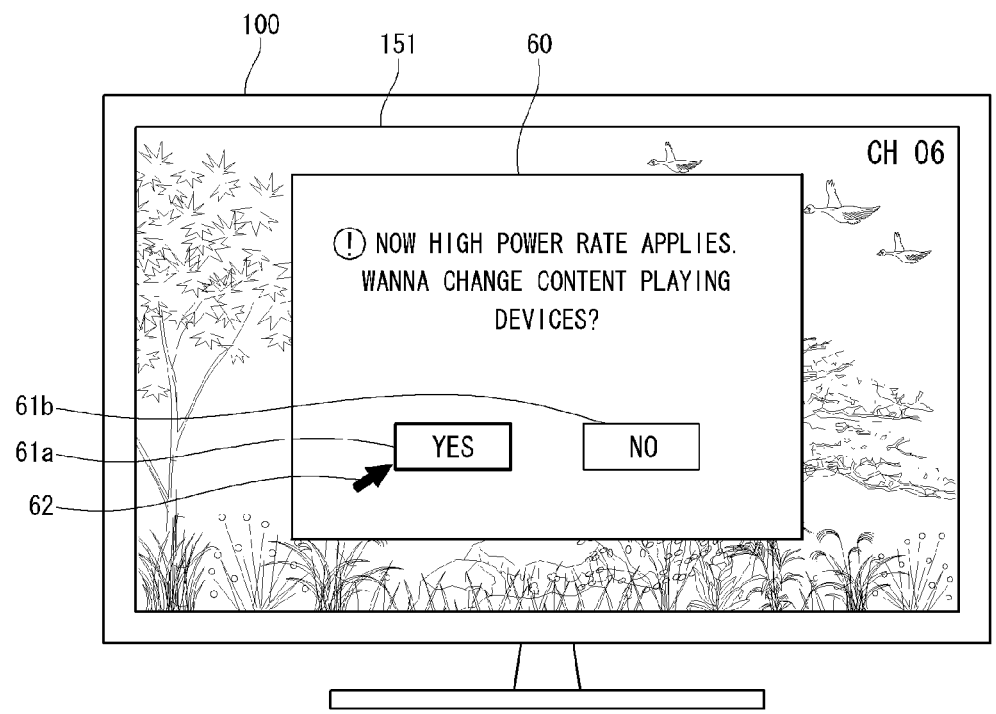

FIG. 13 illustrates an example where when the current time enters into the high rate time slot (S130), the controller 180 provides a first user interface 60 that allows the user to confirm change of electronic devices playing the content.

The first user interface 60 includes an icon corresponding to a "yes" and an icon 61b corresponding to a "no".

The user may select one of the icons 61a and 61b by manipulating the remote controller 190.

For example, the user shifts a cursor 62 to one of the icons 61a and 61b on the display unit 151 and presses a confirmation key on the remote controller 190 for icon selection.

For example, the user may also make a selection of one of the icons 61a and 61b by pressing one of key buttons corresponding to the icons 61a and 61b among various key buttons on the remote controller 190.

Besides what has been described above, the user may also use his motion, gesture, or voice for icon selection.

Figure 14A:
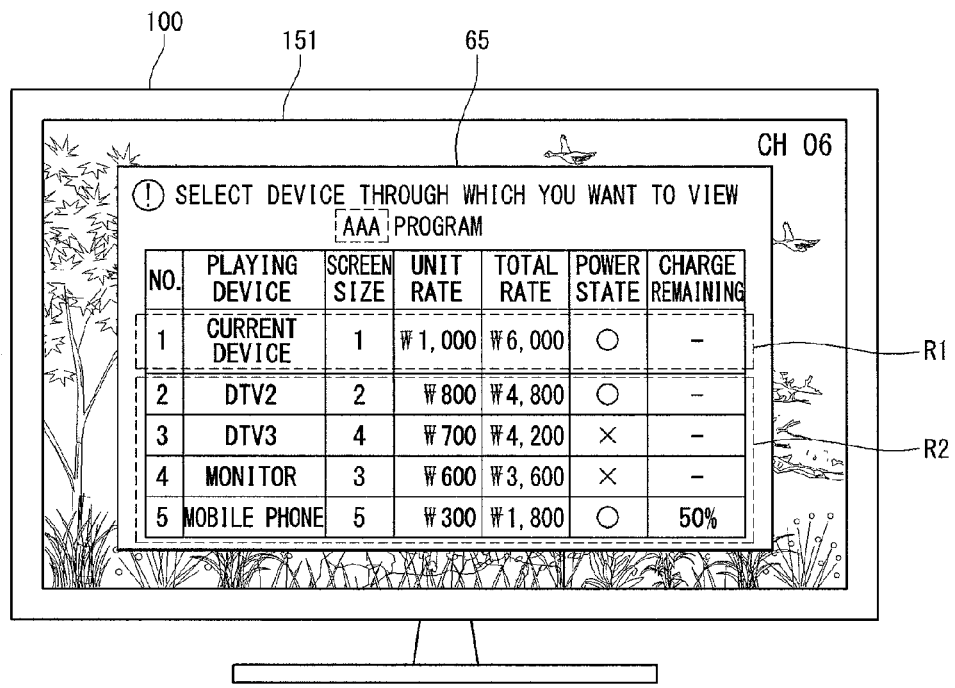
Figure 14B:
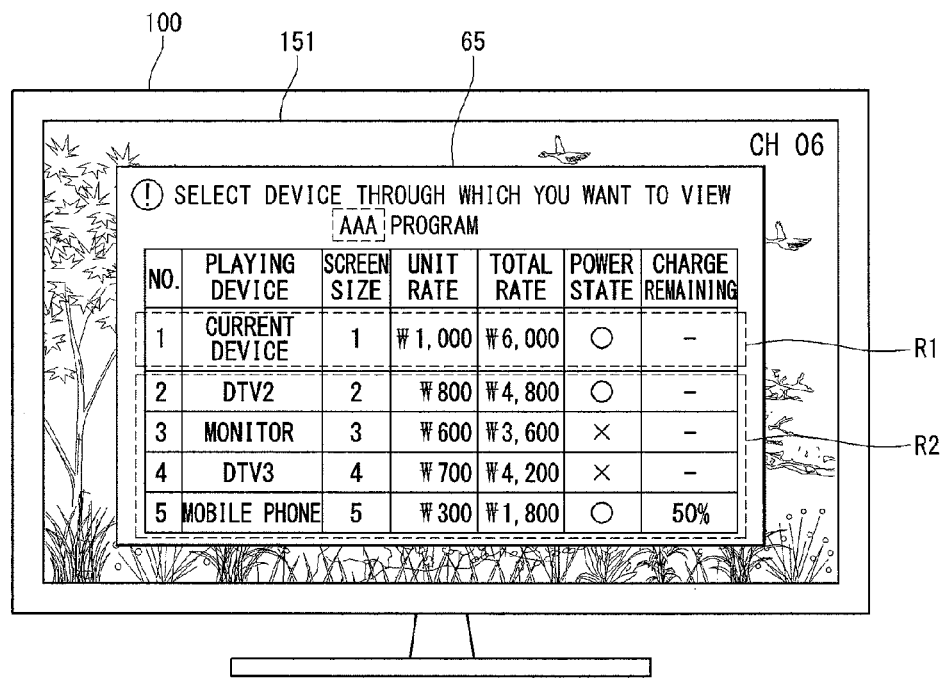
Figure 14C:
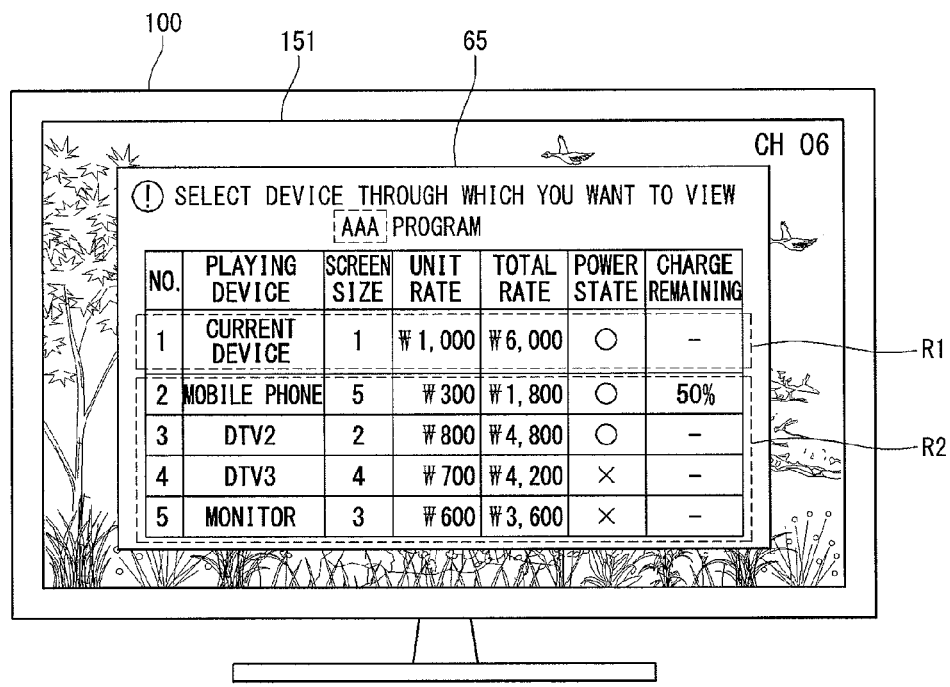

The controller 180 may provide a second user interface 65 with a list of selectable alternative electronic devices as shown in FIGS. 14A to 14C. FIGS. 10A to 10C illustrate an example of the second user interface 65.

Referring to FIG. 14A, the controller 180 may provide a list of alternative electronic devices through the second user interface 65. The list may include the alternative electronic devices, screen sizes of the alternative electronic devices, unit electricity rates and total rates of the alternative electronic devices, power states of the alternative electronic devices, whether the alternative electronic devices are portable terminals (not shown), charge remaining of the portable terminals, and how long the contents may be played with the charge remaining (not shown). According to an embodiment, the list may further include information on a criterion necessary for the user to select any one of the alternative electronic devices.

As described above, the alternative electronic devices may be electronic devices that have a lower degree of power consumption than the first electronic device 100 currently playing the contents. For example, the alternative electronic devices may be electronic devices that have a lower degree of power consumption and are positioned in a specific network to which the first electronic device 100 belongs, for example, the DLNA network 400. The second user interface 65 may provide a list of the alternative electronic devices.

The screen size refers to a size of screen on which the contents are displayed. Referring to FIG. 14A, as the number decreases, the screen size increases. For example, the first electronic device 100 currently playing the contents has the largest screen size and the mobile phone has the smallest screen size.

The unit electricity power may refer to an electricity rate per unit time for power consumed when an alternative electronic device plays the contents. A reference value of the unit time may be arbitrarily determined by the user. The user may visually identify that electricity rates may be saved by playing the contents with the alternative electronic device.

The total rates may refer to electricity rates of power consumed when playing the contents during the remaining play time.

The power states may represent whether the alternative electronic devices are on or off. The controller 180 may transmit a necessary message to the alternative electronic devices to identify the power states of the alternative electronic devices. For example, when there is no response from the alternative electronic devices within a predetermined time, the alternative electronic devices are determined to be off. Or, the controller 180 may acquire information on the power states of the alternative electronic devices from, for example, a certain managing server. The power states may include information on whether it is necessary to let the user turn on the alternative electronic devices. When it is determined based on the power states that the alternative electronic devices are off, the user may realize that he needs to manually or remotely turn on the alternative electronic devices.

Whether the alternative electronic devices are portable terminals may refer to information on whether the alternative electronic devices have mobility. Whether the alternative electronic devices are portable terminals may be previously determined for each or every electronic device or may be arbitrarily determined by the user. The controller 180 may determine whether the alternative electronic devices are portable terminals by querying the alternative electronic devices whether the alternative electronic devices are portable terminals.

The charge remaining may refer to information on how much power was electrically charged to the alternative electronic devices in a case where the alternative electronic devices are portable terminals. The controller 180 may identify the charge remaining by requesting the alternative electronic devices to send the charge remaining and periodically receiving the charge remaining from the alternative electronic devices.

Referring to R1 of FIG. 14A, the user may identify what device is currently playing the contents and that the screen size is 1, the unit power rate is 1000 Won, and the total rate is 6000 Won through the list of alternative electronic devices. Referring to R2 of FIG. 14A, the user may identify information on the alternative electronic devices. For example, the user may identify that a DTV3 has a screen size of 4 and is now off.

The user may also identify that a mobile phone has a screen size of 5, which is smallest, is now on, and has a charge remaining of 50%. In a case where the charge remaining is 50% as described above, additional information may also be displayed that indicates how many minutes the contents are further played.

The user may determine which alternative electronic device may save electricity rate by comparing R1 with R2. The user may also determine which alternative electronic device is proper for him based on R2.

For example, DTV2 has a higher unit rate than that of DTV3, but the screen size of DTV2 is larger than that of DTV3. The user may select one of DTV2 and DTV3 based on his preferred factor between the unit electricity free and the screen size.

FIGS. 14B and 14C illustrates other examples of the second user interface according to embodiments of the present invention. Returning to FIG. 14A, the alternative electronic devices are sorted in descending order of the unit electricity rates.

Referring to FIG. 14B, the alternative electronic devices are sorted in descending order of the screen sizes, and referring to FIG. 14C, the alternative electronic devices are sorted in descending order of frequencies of use.

According to an embodiment, while providing the second user interface 65, the controller 180 may make a sort based on the screen sizes, the unit electricity rates, the frequencies of having selected the alternative electronic devices, the power states, whether the alternative electronic devices are portable terminals, the charge remaining, and how long the contents may be played with the charge remaining.

For example, a list of alternative electronic devices may be provided to the user suitably for user's convenience, so that the user may easily select the alternative electronic devices.

After selecting an alternative electronic device to play the content automatically or manually by the user as described above, the controller 180 displays the source list obtained in the embodiment described in connection with FIGS. 10 and 11 on the display unit 151 (S210).

Figure 15:
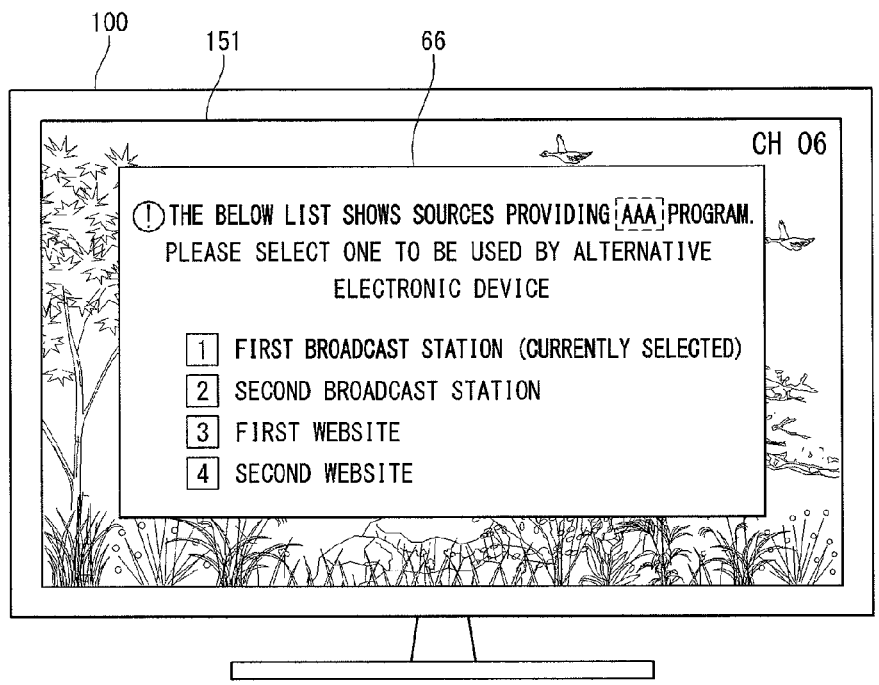

FIG. 15 illustrates an example of displaying the source list on the screen. FIG. 16 is a view illustrating connection information corresponding to respective sources.

Referring to FIG. 15, the controller 180 displays a third user interface 66 containing the source list and necessary information on the display unit 151.

The controller 180 receives a selection signal for at least a source from the source list in the third user interface 66 (S220). For example, a user may select at least a source from the source list.

The controller 180 transfers information on the source selected in step S220 to the alternative electronic device selected in step S200 (S230).

An exemplary operation of the alternative electronic device that has received the information on the at least one source will be described below in more detail.

Figure 17:
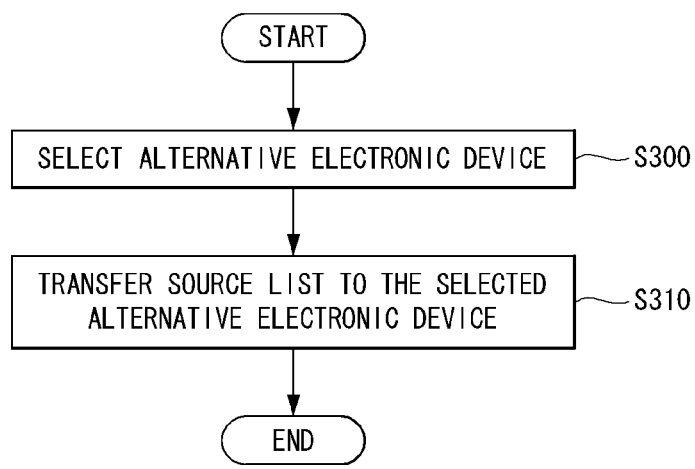
FIG. 17 is a flowchart illustrating a method of controlling an electronic device according to an embodiment of the present invention.

FIG. 17 is a flowchart illustrating a method of controlling an electronic device according to an embodiment of the present invention.

The method of controlling an electronic device may be implemented by the plurality of electronic devices 100, 101, 102, and 103 and the environment described in connection with FIGS. 1 to 9. Hereinafter, the controlling method and the operation of an electronic device for implementing the controlling method will be described in detail by employing the first electronic device (DTV) 100 as the electronic device. However, the use of the first electronic device 100 is merely an example, and various types of electronic devices may also be adopted according to embodiments.

Referring to FIG. 17, the controller 180 selects the alternative electronic device (S300). Step S300 is the same or substantially the same as step S200 of the embodiment described in connection with FIG. 12.

The controller 180 transfers at least some of the sources in the source list obtained in step S120 of the embodiment described in connection with FIG. 10 to the selected alternative electronic device (S310).

The controller 180 may configure the sources in the source list that are to be transferred to the alternative electronic device in various manners.

For example, the controller 180 may transmit a source list including only the other sources than the source currently providing the content to the alternative electronic device.

For example, the controller 180 may select a particular source or particular sources among the plurality of sources based on a predetermined standard and may transfer the selected Also, the controller 180 may configure the source list by selecting sources that may be accessed by the selected alternative electronic device. For example, in a case where the selected alternative electronic device does not have a broadcast receipt function, the alternative electronic device may not use broadcast-related source information even if the broadcast-related source information is transferred to the alternative electronic device. Accordingly, under this situation, the controller 180 may configure the source list except for the broadcast-related source and may transfer the source list to the alternative electronic device.

The first electronic device 100 needs to know information on communication means accessible by the selected alternative electronic device. The first electronic device 100 may previously store the information, or if necessary, may obtain the information by communicating with the selected alternative electronic device.

An exemplary operation of the alternative electronic device that has received the information on the at least one source will be described below in more detail.

Figure 18:
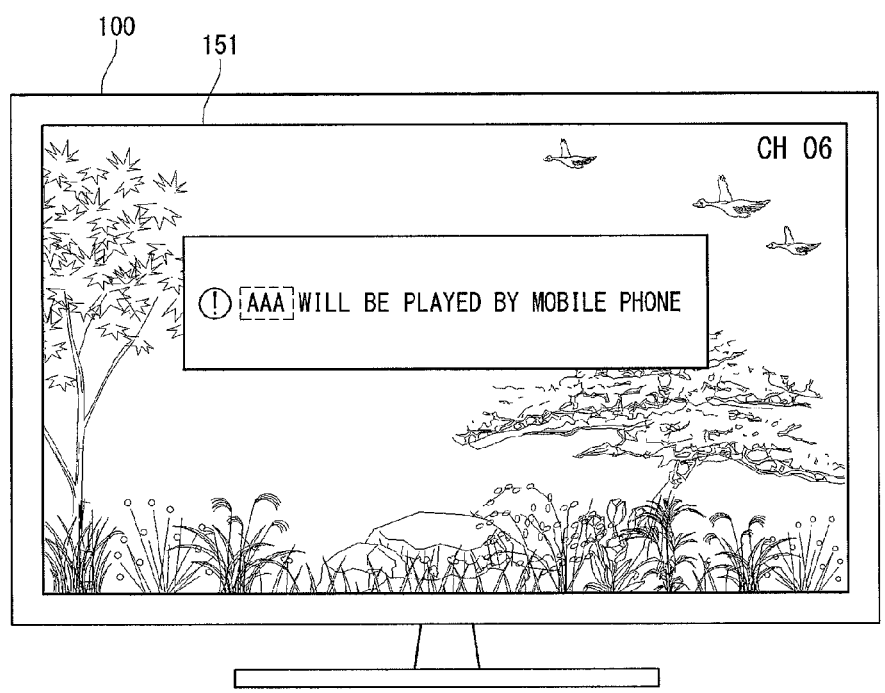
FIG. 18 illustrates an exemplary screen when the embodiment described in connection with FIG. 12 or the embodiment described in connection with FIG. 17 is embodied.

FIG. 18 illustrates an exemplary screen when the embodiment described in connection with FIG. 12 or the embodiment described in connection with FIG. 17 is embodied. When a mobile phone is selected as the alternative electronic device, the controller 180 may provide notification information to a user through the output unit 150 to notify the user that the mobile phone has been selected as the alternative electronic device. For example, the user may identify the selected alternative electronic device once again.

Also, in the case of transferring the information on the content providing source automatically or by user's selection to the alternative electronic device as the high rate time slot starts, the controller 180 of the first electronic device 100 may control all or some of the modules included in the first electronic device in a power saving mode.

For example, while performing the transfer operation, the controller 180 may put a content output-related module among the plurality of modules configuring the first electronic device 100 under the power saving mode.

For example, as in general the display unit 151 consumes power most and the user does not view the content through the first electronic device 100 any longer, the controller 180 may stop supplying power to the display unit 151. The controller 180 may also stop supplying power to the A/V decoder 184.

In a case where the display unit 151 is provided independently from the first electronic device 100, the controller 180 may output a control signal for stopping power supply to the display unit 151 and may transfer the control signal to the display unit 151.

For example, the controller 180 may power off the first electronic device 100 when allowing the alternative electronic device to play the content by transferring the information to the alternative electronic device.

Figure 19:
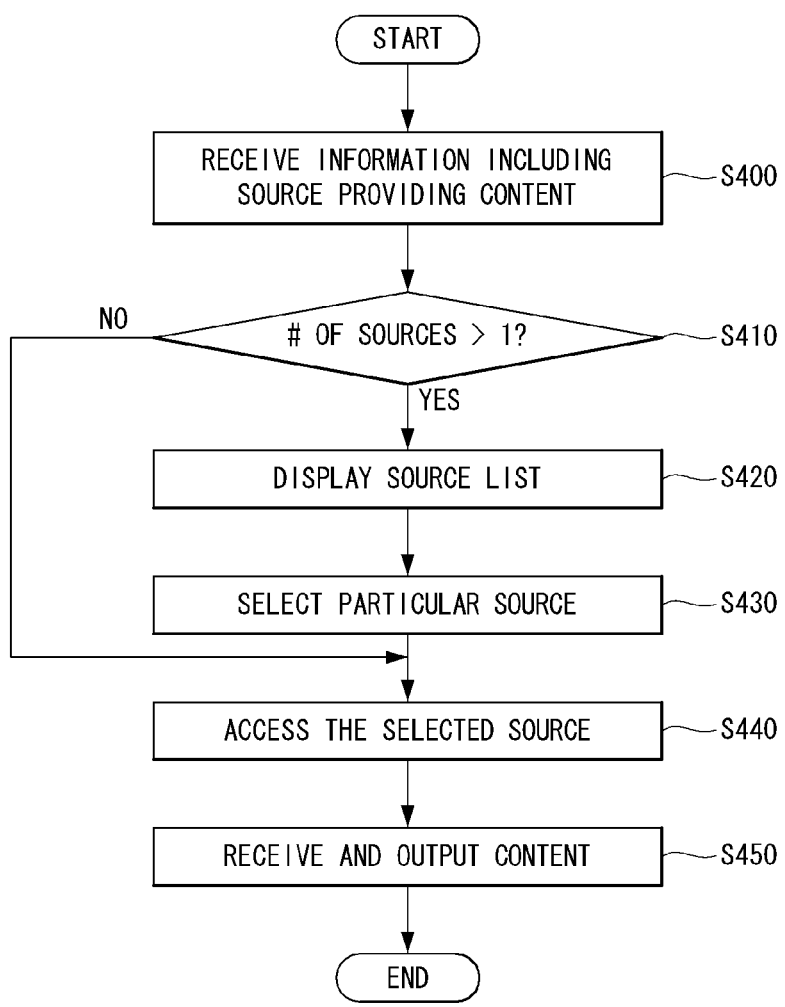
FIG. 19 is a flowchart illustrating a method of controlling an electronic device according to an embodiment of the present invention.
Figure 20:
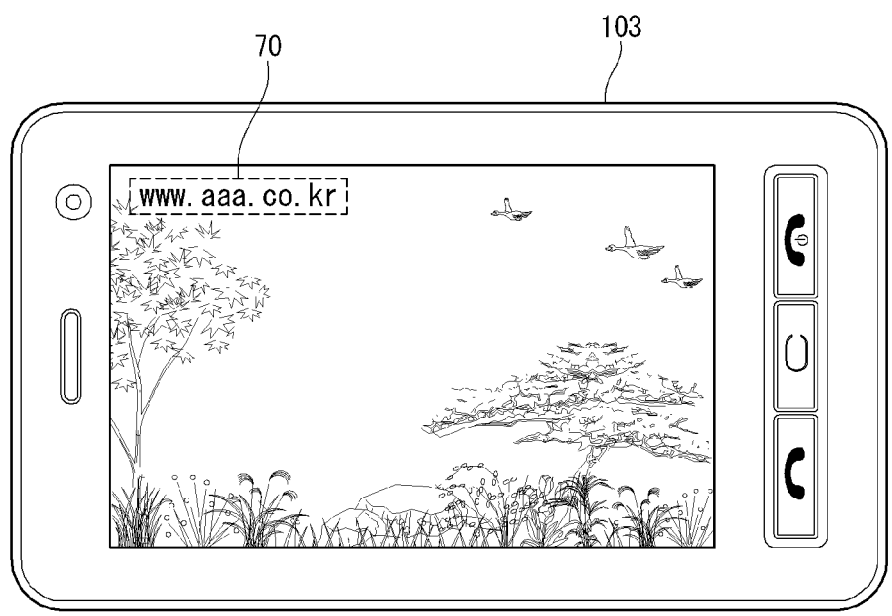
FIGS. 20 to 21 are views illustrating a method of controlling an electronic device according to an embodiment of the present invention.
Figure 21:
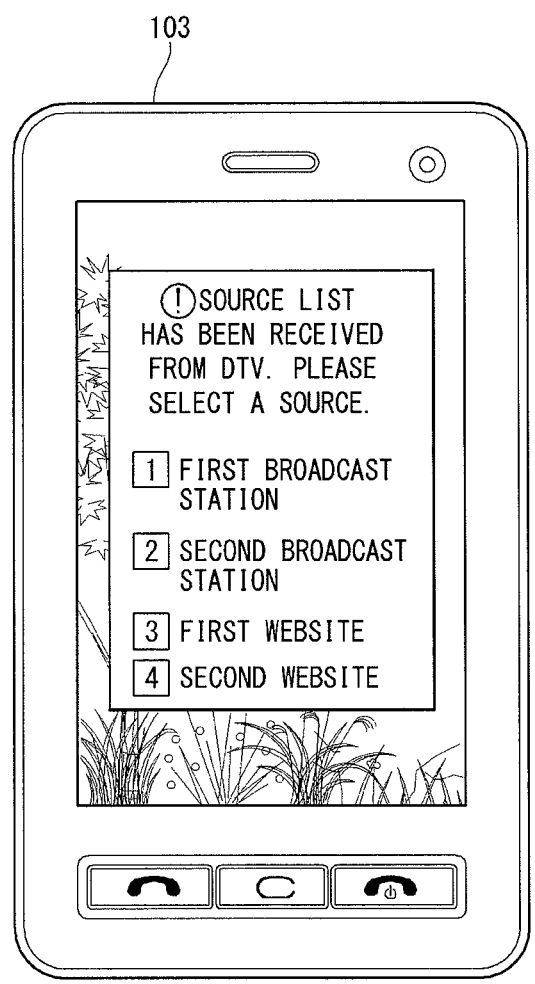

FIG. 19 is a flowchart illustrating a method of controlling an electronic device according to an embodiment of the present invention. FIGS. 20 to 21 are views illustrating a method of controlling an electronic device according to an embodiment of the present invention.

The method of controlling an electronic device may be implemented by the plurality of electronic devices 100, 101, 102, and 103 and the environment described in connection with FIGS. 1 to 9.

Hereinafter, the controlling method and the operation of an electronic device for implementing the controlling method will be described in detail by employing the fourth electronic device (mobile phone) 103 as the electronic device. However, the use of the fourth electronic device 103 is merely an example, and various types of electronic devices may also be adopted according to embodiments.

Referring to FIG. 19, the fourth electronic device 103 receives information on at least one source providing the content from the first electronic device 100 (S400).

The fourth electronic device 103 may also receive a command to play the content using the source information from the first electronic device 100. The fourth electronic device 103 may automatically perform the steps to be described below based on the command.

If the fourth electronic device 103 has been turned off, the fourth electronic device 103 may receive an ON command from the first electronic device 100. In response to the ON command, the fourth electronic device 103 may be fed power and may be thereby turned on.

The fourth electronic device 103 determines whether the received information includes a plurality of sources (S410). If a single source is included, the fourth electronic device 103 connects to the received source (S440), and receives content from the source and outputs the received content (S450).

FIG. 20 illustrates an exemplary screen of connecting to a source 70 received from the first electronic device 100, of receiving content from the source 70, and of outputting the received content.

As such, if the high rate time slot starts while a user views particular content through the first electronic device 100, the above-described procedures are performed so that the user may keep viewing the content using an alternative electronic device, such as the fourth electronic device 103.

On the other hand, if it is determined in step S410 that a plurality of sources are included in the information, the fourth electronic device 103 displays the source list containing the plurality of sources on the display unit (S420).

FIG. 21 illustrates an exemplary screen of displaying a source list containing a plurality of sources on the fourth electronic device 103.

A user selects a particular source from the source list shown in FIG. 21 (S430). The fourth electronic device 103 accesses the particular source selected by the user (S440), receives the content from the particular source, and outputs the received content (S450).

Figure 22:
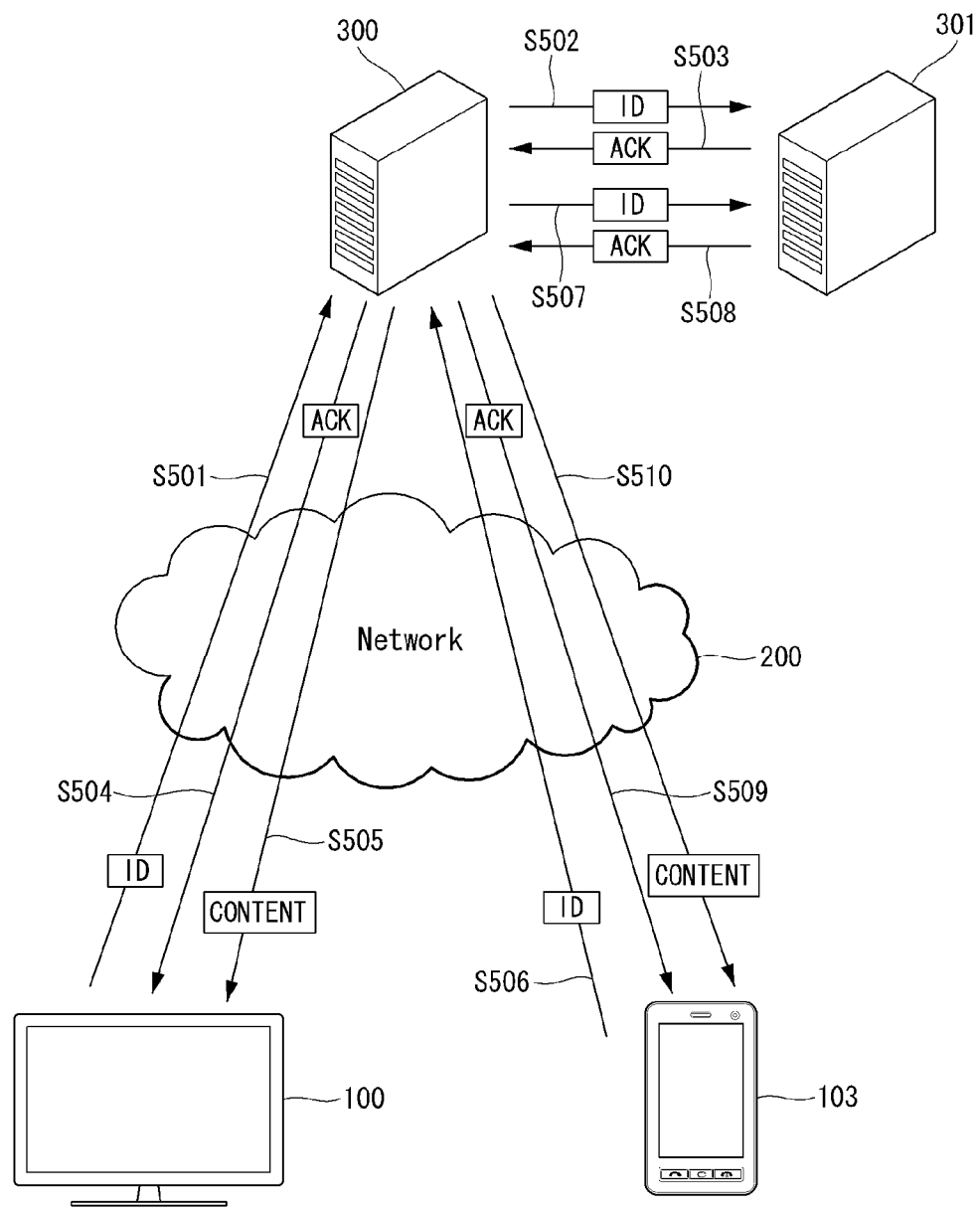
FIG. 22 is a flowchart illustrating a method of controlling an electronic device according to an embodiment of the present invention.

FIG. 22 is a flowchart illustrating a method of controlling an electronic device according to an embodiment of the present invention. The method of controlling an electronic device may be implemented by the plurality of electronic devices 100, 101, 102, and 103 and the environment described in connection with FIGS. 1 to 9.

Hereinafter, the controlling method and the operation of an electronic device for implementing the controlling method will be described in detail by employing the first electronic device (DTV) 100 and the fourth electronic device (mobile phone) 103 as the electronic devices. The fourth electronic device 103 has been selected as an alternative electronic device in the embodiments described in connection with FIGS. 10 to 18. However, the use of the first and fourth electronic devices 100 and 103 is merely an example, and various types of electronic devices may also be adopted according to embodiments.

To receive specific content, the first electronic device 100 accesses the content providing server 300 that provides the particular content and requests that the server 300 provide the content to the device 100.

It is assumed that the content providing server 300 may service the particular content in a streaming manner.

Referring to FIG. 22, the first electronic device 100 provides user authentication information including an ID (identification) to the content providing server 300 (S501).

The content providing server 300 transfers the user authentication information to a DRM (Digital Rights Management) server 301 (S502).

Using the user authentication information, the DRM server 301 determines whether the first electronic device 100 and/or a user of the first electronic device 100 have been registered or whether a right to download the content is granted to the first electronic device or the user. If registered or granted the right, the DRM server 301 transmits an authorization signal to the content providing server 300 (S503).

In response to the authorization signal, the content providing server 300 transfers an authorization signal for a content providing request to the first electronic device 100 (S504) and provides the particular content to the first electronic device 100 (S505).

The DRM server 301 may produce and store a log file relating to transfer of the particular content and/or authorization for a transfer request of the particular content for the first electronic device 100 and/or the user of the first electronic device 100.

The first electronic device 100 may receive the particular content from the content providing server 300 and may play the received content.

If the high rate time slot starts while the particular content is played by the first electronic device 100, the fourth electronic device 103 may be selected as an alternative electronic device to play the particular content.

The same or substantially the same steps as the above-described steps S501 to S505 may be repeatedly performed when the fourth electronic device 103 is selected as the alternative electronic device.

For example, the fourth electronic device 103 transfers user authentication information including an ID (identification) to the content providing server 300 (S506).

The content providing server 300 transfers the user authentication information to the DRM server 301 (S507).

Using the user authentication information, the DRM server 301 determines whether the fourth electronic device 103 and/or a user of the fourth electronic device 103 have been registered or whether a right to download the particular content is granted to the user or the fourth electronic device 103. If registered or granted the right, the DRM server 301 transfers an authorization signal to the content providing server 300 (S508).

To determine whether registration has been made or whether there is a right to download, the DRM server 301 may use the log file. For example, such determination may be made based on a comparison between authentication information recorded in the log file and the user authentication information received in step S507.

In response to the authorization signal from the DRM server 301, the content providing server 300 transfers an authorization signal for a content providing request to the fourth electronic device 103 (S509) and provides the particular content to the fourth electronic device 103 (S510).

Figure 23:
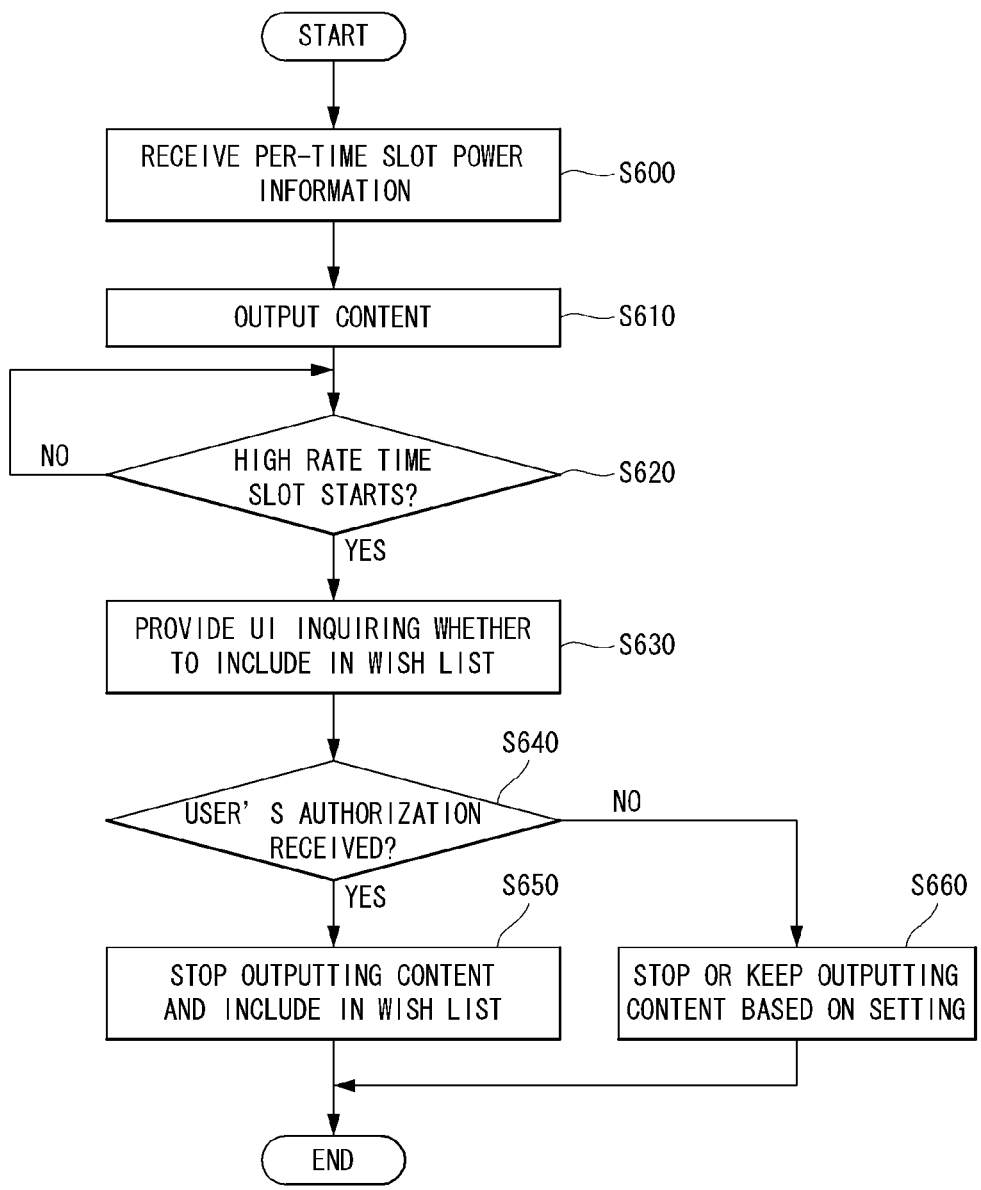
FIG. 23 is a flowchart illustrating a method of controlling an electronic device according to an embodiment of the present invention.
Figure 24:
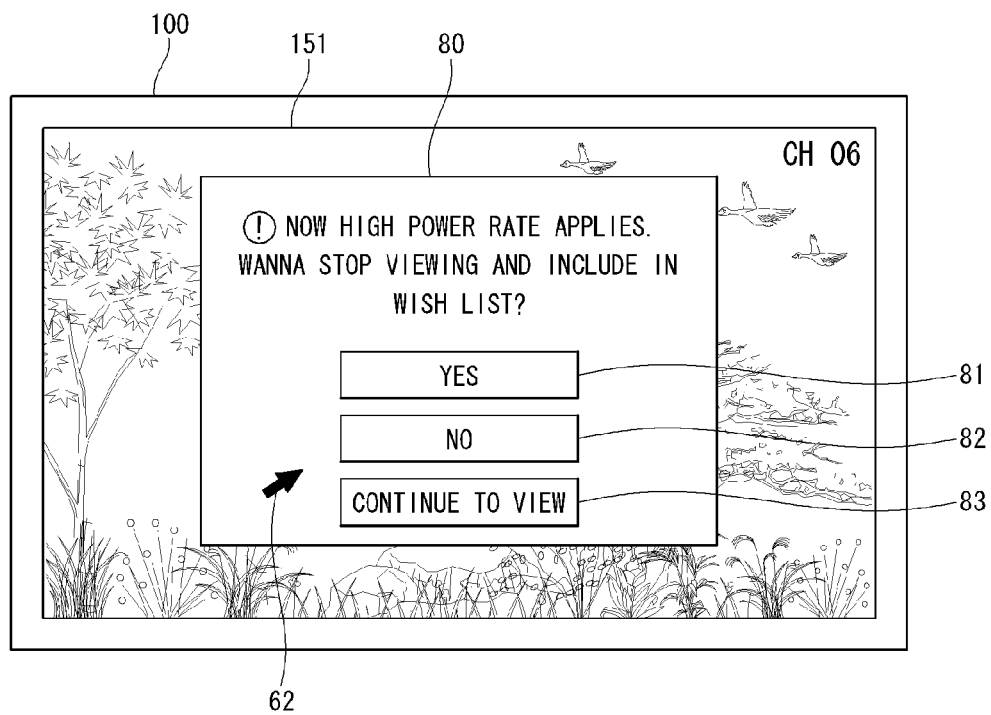
FIGS. 24 and 25 are views illustrating a method of controlling an electronic device according to an embodiment of the present invention.
Figure 25:
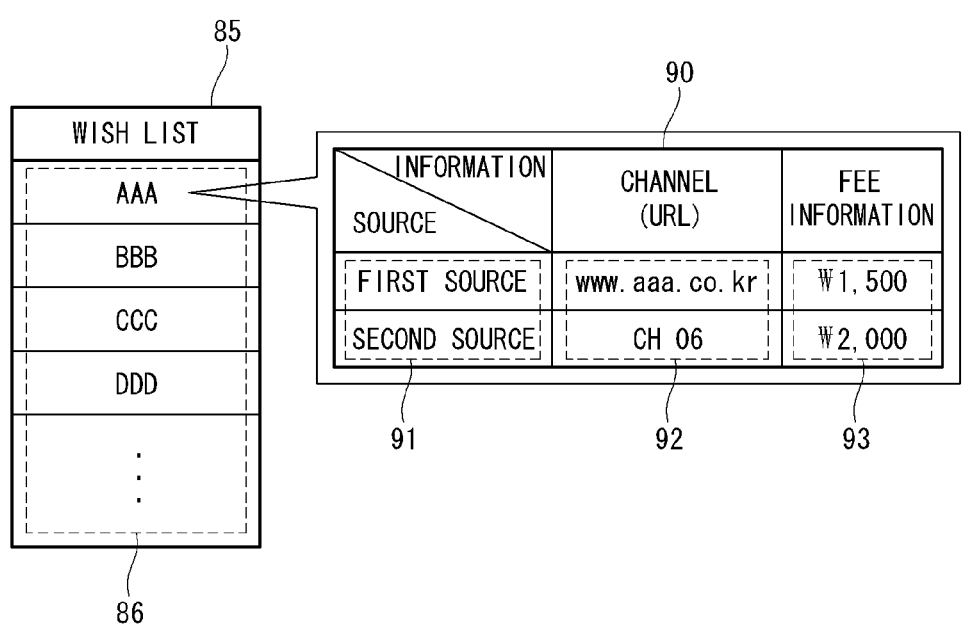

FIG. 23 is a flowchart illustrating a method of controlling an electronic device according to an embodiment of the present invention. FIGS. 24 and 25 are views illustrating a method of controlling an electronic device according to an embodiment of the present invention.

The method of controlling an electronic device may be implemented by the plurality of electronic devices 100, 101, 102, and 103 and the environment described in connection with FIGS. 1 to 9. Hereinafter, the controlling method and the operation of an electronic device for implementing the controlling method will be described in detail by employing the first electronic device (DTV) 100 as the electronic device. However, the use of the first electronic device 100 is merely an example, and various types of electronic devices may also be adopted according to embodiments.

Referring to FIG. 23, the controller 180, as described above, receives power information including at least one of per-time slot electricity rate information and power demand information through the communication unit 130 (S600). Step S600 corresponds to step S100 of the embodiment described in connection with FIG. 10.

While outputting content (S610), the controller 180 determines whether the high rate time slot starts (S620). Steps S610 and S620 correspond to steps S110 and S130, respectively, of the embodiment described in connection with FIG. 10.

If it is determined in step S620 that the high rate time slot starts, the controller 180 provides a user interface inquiring that the outputting content is to be included in a list of contents whose play will be stopped (S630). As used herein, the list is also referred to as "wish list". The wish list may be stored in the memory 160.

FIG. 24 illustrates an exemplary screen of providing a user interface inquiring that a content is to be included in the wish list.

For example, referring to FIG. 24, the controller 180 may provide the user interface 80 to the display unit 151 when the high rate time slot starts.

A user may stop outputting the content he is currently viewing using the user interface 80 and may include the content in the wish list.

The controller 180 determines whether to receive an authorization to stop outputting the content and to include the content in the wish list through the user interface 80 (S640).

For example, as shown in FIG. 24, if the user controls the cursor 62 to select the button 81, "Yes", the controller 180 stops outputting the content and determines whether to have received a command to include the content in the wish list.

If the user selects the button 81, "Yes", the controller 180 may include the outputting content in the wish list 85 as shown in FIG. 25.

The wish list 85, as shown in FIG. 25, may include at least one content 86. The wish list 85 may accumulatively store and manage the at least one content 86.

If it is determined in step S640 that the authorization is received, the controller 180 stops outputting the content and may include the stopped content in the wish list (S650). The user may access the wish list to view his desired content anytime.

While managing the wish list stored in the memory 160, the controller 180 may manage information on the source providing the content as well.

For example, as shown in FIG. 25, the controller 180 may obtain source information 90 on content "AAA" and may match the source information with the content "AAA". The obtainment and matching of the source information 90 may be performed simultaneously with step S650 or when the user approaches the wish list afterwards to view the content "AAA".

As shown in FIG. 25, the source information 90 may include at least one source identifier 91, information on a channel (or URL) corresponding to each source (hereinafter, also referred to as "channel information 92"), and fee information 93.

The fee information 93 may include at least one of the electricity rate information and service fee information.

Unless the authorization is received through the user interface 80, the controller 180 may stop or keep outputting the content based on a setting or command (S660).

For example, as shown in FIG. 24, if the user selects a button 82, "No", on the user interface 80, the controller 180 may stop outputting the content. The controller 180 stops the output of the content but does not include the content in the wish list.

Also, for example, if the user selects a button 83, "keep viewing", on the user interface 80, the controller 180 may continue to output the content.

According to the embodiments, it is possible to allow a user to view broadcast contents through an alternative electronic device that consumes less power at a peak time slot during which the highest electricity rate applies based on smart grid information provided from a smart grid network.

The above-described method of controlling the electronic device may be written as computer programs and may be implemented in digital microprocessors that execute the programs using a computer readable recording medium.

The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device comprising:
  a communication unit that includes a receiving unit, the receiving unit receiving power information including at least one of per-time slot electricity rate information and power demand information associated with a smart grid;
  an output unit configured to output content; and
  a controller configured to obtain a source list including information on at least one source that provides the content while outputting the content through the output unit and, when a high rate time slot starts according to the received power information, to provide the source list.

2. The electronic device of claim 1, wherein the controller is further configured to transfer the source list to an alternative electronic device through the communication unit.

3. The electronic device of claim 2, wherein the controller is further configured to control the output unit or a module associated with output of the content among a plurality of modules configuring the electronic device in a power saving mode when the transfer operation is performed.

4. The electronic device of claim 3, wherein the output unit includes a display unit inside or outside the electronic device.

5. The electronic device of claim 2, wherein the electronic device and the alternative electronic device communicate with each other over a DLNA (Digital Living Network Alliance) network.

6. The electronic device of claim 1, wherein the controller is further configured to transfer information on at least one source selected from the source list to an alternative electronic device through the communication unit.

7. The electronic device of claim 6, wherein the controller is further configured to control the output unit or a module associated with output of the content among a plurality of modules configuring the electronic device in a power saving mode when the transfer operation is performed.

8. The electronic device of claim 7, wherein the output unit includes a display unit inside or outside the electronic device.

9. The electronic device of claim 6, wherein the electronic device and the alternative electronic device communicate with each other over a DLNA (Digital Living Network Alliance) network.

10. The electronic device of claim 1, wherein the source list includes information on a source providing the content being outputted through the output unit.

11. The electronic device of claim 1, wherein the source list does not include information on a source providing the content being outputted through the output unit.

12. The electronic device of claim 1, wherein the controller is configured to configure the source list with sources accessible by the alternative electronic device or to provide information on whether the alternative electronic device may access at least one source included in the source list.

13. The electronic device of claim 1, wherein the alternative electronic device is selected by a user.

14. The electronic device of claim 1, wherein the information on the at least one source includes at least one of information on a website and broadcast information including a broadcast channel.

15. A method of controlling an electronic device comprising:
    outputting content;
    receiving power information including at least one of per-time slot electricity rate information and power demand information;
    obtaining a source list including information on at least one source providing the content; and
    providing the source list when a high-rate time slot starts according to the received power information while the content is outputted.

16. The method of claim 15, wherein providing the source list includes transferring the source list to an alternative electronic device.

17. The method of claim 16, further comprising:
    controlling a module associated with output of the content among a plurality of modules configuring the electronic device in a power saving mode when the transfer operation is performed.

18. The method of claim 15, wherein providing the source list includes,
    displaying the source list on a display unit of the electronic device,
    receiving a selection signal for at least one source from the displayed source list, and
    transferring the selected at least one source to an alternative electronic device.

19. The method of claim 18, further comprising:
    controlling a module associated with output of the content among a plurality of modules configuring the electronic device in a power saving mode when the transfer operation is performed.

20. The method of claim 15, wherein the source information includes at least one of information on a website and broadcast information including a broadcast channel.

21. An electronic device comprising:
    a communication unit that includes a receiving unit, the receiving unit receiving power information including at least one of per-time slot electricity rate information and power demand information associated with a smart grid;
    an output unit configured to output content; and
    a controller configured to provide a user interface inquiring whether to stop outputting the content and whether to include the content in a list of contents accessible by a user when a high rate time slot starts according to the received power information while the content is outputted through the output unit.

22. The electronic device of claim 21, wherein when stopping outputting the content and including the content in the content list in response to a user's request received through the user interface, the controller is further configured to obtain information on at least one source providing the content and to match the information with the content.

* * * * *